(12) United States Patent
Baliga et al.

(10) Patent No.: US 10,069,799 B2
(45) Date of Patent: Sep. 4, 2018

(54) METHODS AND APPARATUS TO CONFIGURE VIRTUAL PRIVATE MOBILE NETWORKS FOR SECURITY

(71) Applicant: AT&T Intellectual Property I, L.P., Atlanta, GA (US)

(72) Inventors: Arati Baliga, Edison, NJ (US); Xu Chen, Ann Arbor, MI (US); Baris Coskun, Weehawken, NJ (US); Gustavo de los Reyes, Fair Haven, NJ (US); Seungjoon Lee, Basking Ridge, NJ (US); Suhas Mathur, Edison, NJ (US); Jacobus Van der Merwe, New Providence, NJ (US); Gang Xu, Piscataway, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 15/194,037

(22) Filed: Jun. 27, 2016

(65) Prior Publication Data
US 2016/0308837 A1    Oct. 20, 2016

Related U.S. Application Data

(63) Continuation of application No. 13/165,520, filed on Jun. 21, 2011, now Pat. No. 9,386,035.

(51) Int. Cl.
*H04L 29/06* (2006.01)
*H04W 12/08* (2009.01)

(52) U.S. Cl.
CPC ........ *H04L 63/0272* (2013.01); *H04L 63/145* (2013.01); *H04L 63/1416* (2013.01); *H04L 63/1458* (2013.01); *H04W 12/08* (2013.01)

(58) Field of Classification Search
None
See application file for complete search history.

(56) References Cited

U.S. PATENT DOCUMENTS 5,345,502 A    9/1994   Rothenhofer
5,475,819 A    12/1995  Miller et al.
(Continued)

OTHER PUBLICATIONS

Van Der Merwe et al., "Dynamic Connectivity Management with an Intelligent Route Service Control Point," AT&T Labs, Proceedings of the 2006 SIGCOMM Workshop on Internet Network Management, held on Sep. 11-16, 2006, (6 pages).

(Continued)

*Primary Examiner* — Nadia Khoshnoodi
(74) *Attorney, Agent, or Firm* — Hanley, Flight and Zimmerman, LLC

(57) ABSTRACT

Methods and apparatus to configure virtual private mobile networks are disclosed. Example methods include provisioning a virtual private mobile network within a wireless network, and, after provisioning the virtual private mobile network, determining whether a first communication from a user equipment matches a security event profile. When the first communication matches the profile, the example methods include transmitting, from the wireless network via a first base transceiver station, an instruction to cause the user equipment to be communicatively coupled to the virtual private mobile network. The example methods further include instructing the user equipment to transmit a second communication through a second base transceiver station that is physically separate from the first base transceiver station and through the virtual private mobile network. In the example methods, the virtual private mobile network is isolated in a wireless spectrum from other portions of the network.

17 Claims, 9 Drawing Sheets

(56) References Cited

U.S. PATENT DOCUMENTS

| | | |
|---|---|---|
| 5,623,601 A | 4/1997 | Vu |
| 6,016,318 A | 1/2000 | Tomoike |
| 6,029,067 A | 2/2000 | Pfundstein |
| 6,058,426 A | 5/2000 | Godwin et al. |
| 6,079,020 A | 6/2000 | Liu |
| 6,205,488 B1 | 3/2001 | Casey et al. |
| 6,781,982 B1 | 8/2004 | Borella et al. |
| 6,880,002 B2 | 4/2005 | Hirschfeld et al. |
| 6,885,864 B2 | 4/2005 | McKenna et al. |
| 6,891,842 B2 | 5/2005 | Sahaya et al. |
| 6,954,790 B2 | 10/2005 | Forslow |
| 6,976,177 B2 | 12/2005 | Ahonen |
| 6,990,666 B2 | 1/2006 | Hirschfeld et al. |
| 7,072,346 B2 | 7/2006 | Hama |
| 7,075,933 B2 | 7/2006 | Aysan |
| 7,126,921 B2 | 10/2006 | Mark et al. |
| 7,131,141 B1 | 10/2006 | Blewett et al. |
| 7,185,106 B1 | 2/2007 | Moberg et al. |
| 7,221,675 B2 | 5/2007 | Bryden et al. |
| 7,225,270 B2 | 5/2007 | Barr et al. |
| 7,292,575 B2 | 11/2007 | Lemieux et al. |
| 7,340,519 B1 | 3/2008 | Golan et al. |
| 7,366,188 B2 | 4/2008 | Kim |
| 7,388,844 B1 | 6/2008 | Brown et al. |
| 7,400,611 B2 | 7/2008 | Mukherjee et al. |
| 7,415,627 B1 | 8/2008 | Radhakrishnan et al. |
| 7,738,891 B2 | 6/2010 | Tenhunen et al. |
| 7,769,036 B2 | 8/2010 | Sorge et al. |
| 8,077,681 B2 | 12/2011 | Ahmavaara et al. |
| 8,380,863 B2 | 2/2013 | Natarajan et al. |
| 8,458,787 B2 | 6/2013 | Wei et al. |
| 8,509,169 B2 | 8/2013 | Van Der Merwe et al. |
| 2002/0181477 A1 | 12/2002 | Mo et al. |
| 2003/0051021 A1 | 3/2003 | Hirschfeld et al. |
| 2003/0147403 A1 | 8/2003 | Border et al. |
| 2003/0188001 A1 | 10/2003 | Eisenberg et al. |
| 2004/0073642 A1 | 4/2004 | Iyer |
| 2004/0148439 A1 | 7/2004 | Harvey et al. |
| 2005/0071508 A1 | 3/2005 | Brown et al. |
| 2005/0138204 A1 | 6/2005 | Iyer et al. |
| 2005/0195780 A1 | 9/2005 | Haverinen et al. |
| 2006/0025149 A1 | 2/2006 | Karaoguz et al. |
| 2006/0068845 A1 | 3/2006 | Muller et al. |
| 2006/0083205 A1 | 4/2006 | Buddhikot et al. |
| 2006/0111113 A1 | 5/2006 | Waris |
| 2006/0168279 A1 | 7/2006 | Lee et al. |
| 2006/0168321 A1 | 7/2006 | Eisenberg et al. |
| 2006/0242305 A1 | 10/2006 | Alnas |
| 2006/0251088 A1 | 11/2006 | Thubert et al. |
| 2006/0268901 A1 | 11/2006 | Choyi et al. |
| 2007/0039047 A1 | 2/2007 | Chen et al. |
| 2007/0070914 A1 | 3/2007 | Abigail |
| 2007/0105548 A1 | 5/2007 | Mohan et al. |
| 2007/0140250 A1 | 6/2007 | McAllister et al. |
| 2007/0140251 A1 | 6/2007 | Dong |
| 2007/0195800 A1 | 8/2007 | Yang et al. |
| 2007/0213050 A1 | 9/2007 | Jiang |
| 2007/0217419 A1 | 9/2007 | Vasseur |
| 2007/0232265 A1 | 10/2007 | Park et al. |
| 2007/0271606 A1 | 11/2007 | Amann et al. |
| 2007/0280241 A1 | 12/2007 | Verma |
| 2008/0002697 A1 | 1/2008 | Anantharamaiah et al. |
| 2008/0022094 A1 | 1/2008 | Gupta et al. |
| 2008/0034365 A1 | 2/2008 | Dahlstedt |
| 2008/0049752 A1 | 2/2008 | Grant |
| 2008/0080396 A1 | 4/2008 | Meijer et al. |
| 2008/0080517 A1 | 4/2008 | Roy et al. |
| 2008/0080552 A1 | 4/2008 | Gates et al. |
| 2008/0082546 A1 | 4/2008 | Meijer et al. |
| 2008/0125116 A1 | 5/2008 | Jiang |
| 2008/0148341 A1 | 7/2008 | Ferguson et al. |
| 2009/0006603 A1 | 1/2009 | Duponchel et al. |
| 2009/0113422 A1 | 4/2009 | Kani |
| 2010/0017861 A1 | 1/2010 | Krishnaswamy et al. |
| 2010/0039978 A1 | 2/2010 | Rangan |
| 2010/0111093 A1 | 5/2010 | Satterlee et al. |
| 2010/0186024 A1 | 7/2010 | Eker et al. |
| 2010/0284343 A1 | 11/2010 | Maxwell et al. |
| 2011/0007690 A1 | 1/2011 | Chang et al. |
| 2011/0026468 A1 | 2/2011 | Conrad et al. |
| 2011/0142053 A1 | 6/2011 | Van Der Merwe et al. |
| 2011/0154101 A1 | 6/2011 | Merwe et al. |
| 2011/0177790 A1 | 7/2011 | Monte et al. |
| 2011/0302630 A1 | 12/2011 | Nair et al. |
| 2012/0106565 A1 | 5/2012 | Yousefi et al. |
| 2012/0147824 A1 | 6/2012 | Van der Merwe et al. |
| 2012/0155274 A1* | 6/2012 | Wang .................. H04W 12/12 370/236 |
| 2012/0208506 A1 | 8/2012 | Hirano et al. |
| 2012/0282924 A1 | 11/2012 | Tagg et al. |
| 2012/0303838 A1 | 11/2012 | Kempf et al. |
| 2012/0311107 A1 | 12/2012 | Van der Merwe et al. |
| 2012/0331545 A1 | 12/2012 | Baliga et al. |
| 2013/0007232 A1 | 1/2013 | Wang et al. |
| 2013/0031271 A1 | 1/2013 | Bosch et al. |
| 2013/0089026 A1 | 4/2013 | Piper et al. |
| 2013/0107725 A1 | 5/2013 | Jeng et al. |
| 2015/0237543 A1 | 8/2015 | Montemurro |

OTHER PUBLICATIONS

Van Der Merwe et al., PowerPoint presentation of "Dynamic Connectivity Management with an Intelligent Route Service Control Point," AT&T Labs, Proceedings of the 2006 SIGCOMM Workshop on Internet Network Management, held on Sep. 11-16, 2006, (14 pages).

Brady, Kevin F., "Cloud Computing—Is It Safe for IP?" Portfolio Media, Inc., http://www.law360.com/print_article/113709 on Aug. 27, 2009. Retrieved from the Internet on Sep. 3, 2009, (8 pages).

"Amazon Elastic Computing Cloud," http://aws.amazon.com/ec2. Retrieved from the Internet on Dec. 23, 2009, (8 pages).

Armbrust et al., "Above the Clouds: A Berkeley View of Cloud Computing," Technical Report UCB/EECS-2009-28, EECS Department, University of California, Berkeley, February Technical Report No. UCB/EECS-2009-28, http://www.eecs.berkeley.edu/Pubs/TechRpts/2009/EECS-2009-28.html, Feb. 10, 2009, (25 pages).

Sundararaj et al., "Towards Virtual Networks for Virtual Machine Grid Computing," in VM '04: Proceedings of the 3rd conference on Virtual Machine Research and Technology Symposium, 2004, (14 pages).

Clark et al., "Live Migration of Virtual Machines," in Proceedings of NSDA, http://www.cl.cam.ac.uk/research/srg/netos/papers/2005-migration-nsdi-pre.pdf, May 2005, (14 pages).

Duffield et al., "Resource management with hoses: point-to-cloud services for virtual private networks," IEEE ACM Transactions on Networking, 2002, (16 pages).

Cohen, Reuven, "Elasticvapor Blog: Virtual Private Cloud," www.elasticvapor.com/2008/05/virtual-private-cloud-vpc.htm, May 8, 2008, (2 pages).

"Goggle App Engine" hthttp://code.google.com/appengine/. Retrieevd from the Internet on Dec. 23, 2009, (4 pages).

Nelson et al., "Fast Transparent Migration for Virtual Machines," In ATEC '05 Proceedings of the annual conference on USENIX Annual Technical Conference, 2005, (4 pages).

Ramakrishnan et al., "Live Data Center Migration Across WANs: A Robust Cooperative Context Aware Approach," in INM '07: Proceedings of the SIGCOMM workshop on Internet network management, Aug. 27-31, 2007, (6 pages).

Ruth et al., "Autonomic Live Adaptation of Virtual Computational Environments in a Multi-Domain Infrastructure," in ICAC '06: Proceedings of the 2006 IEEE International Conference of Autonomic Computing, 2006, (10 pages).

United States Patent and Trademark Office, "Final Office Action", issued in connection with corresponding U.S. Appl. No. 13/154,121 dated Feb. 4, 2014 (22 pages).

United States Patent and Trademark Office, "Non-Final Office Action", issued in connection with corresponding U.S. Appl. No. 13/154,121 dated Jul. 17, 2013 (23 pages).

(56) References Cited

OTHER PUBLICATIONS

"Response to Office Action dated Jul. 17, 2013" filed on Nov. 18, 2013 in connection with corresponding U.S. Appl. No. 13/154,121 (11 pages).
United States Patent and Trademark Office, "Non-Final Office Action", issued in connection with corresponding U.S. Appl. No. 12/966,681 dated Dec. 20, 2012 (29 pages).
"Response to Office Action dated Dec. 20, 2012" filed on Mar. 20, 2013 in connection with corresponding U.S. Appl. No. 12/966,681 (11 pages).
United States Patent and Trademark Office, "Non-Final Office Action", issued in connection with corresponding U.S. Appl. No. 13/222,876 dated Dec. 26, 2013 (19 pages).
"Response to Office Action dated Dec. 26, 2013" filed on Mar. 26, 2014 in connection with corresponding U.S. Appl. No. 13/222,876 (12 pages).
United States Patent and Trademark Office, "Final Office Action," issued in connection with U.S. Appl. No. 13/154,121, dated Sep. 19, 2014 (25 pages).
United States Patent and Trademark Office, "Non-Final Office Action," issued in connection with U.S. Appl. No. 13/222,876 dated Jul. 15, 2015 (18 pages).
United States Patent and Trademark Office, "Non-Final Office Action," issued in connection with U.S. Appl. No. 13/222,876 dated Feb. 26, 2015 (21 pages).
United States Patent and Trademark Office, "Non-Final Office Action", issued in connection with U.S. Appl. No. 13/165,520, dated Jan. 15, 2013 (14 pages).
United States Patent and Trademark Office, "Final Office Action", issued in connection with U.S. Appl. No. 13/165,520, dated Jul. 30, 2013 (15 pages).
United States Patent and Trademark Office, "Non-Final Office Action", issued in connection with U.S. Appl. No. 13/165,520, dated Aug. 12, 2015 (5 pages).
United States Patent and Trademark Office, "Notice of Allowance", issued in connection with U.S. Appl. No. 13/165,520, dated Feb. 11, 2016 (7 pages).
United States Patent and Trademark Office, "Non-Final Office Action", issued in connection with U.S. Appl. No. 13/222,876, dated Dec. 7, 2017 (17 pages).
United States Patent and Trademark Office, "Non-Final Office Action", issued in connection with U.S. Appl. No. 13/222,876, dated Sep. 1, 2016 (15 pages).
United States Patent and Trademark Office, "Final Office Action", issued in connection with U.S. Appl. No. 13/222,876, dated Jun. 2, 2017 (16 pages).
United States Patent and Trademark Office, "Notice of Allowance," issued in connection with U.S. Appl. No. 13/222,876, dated Apr. 2, 2018, 14 pages.
United States Patent and Trademark Office, "Non-final Office Action," issued in connection with U.S. Appl. No. 15/231,406, dated Feb. 22, 2018, 28 pages.

\* cited by examiner

| SECURITY EVENTS | 216 |
|---|---|
| 1. VIRUS XXX | 602 |
| 2. WORM XYZ | 604 |
| 3. DDS A2D | 606 |
| 4. JAIL BROKEN DEVICE ABC | 608 |
| 5. SECURITY UPDATE 55XC | 610 |
| 6. APPLICATION – ANGARY ANTS | 612 |

METHODS AND APPARATUS TO CONFIGURE VIRTUAL PRIVATE MOBILE NETWORKS FOR SECURITY

RELATED APPLICATIONS

This patent arises from a continuation of U.S. patent application Ser. No. 13/165,520, entitled, "Methods and Apparatus to Configure Virtual Private Mobile Networks for Security," filed Jun. 21, 2011 (now U.S. Pat. No. 9,386,035, issued Jul. 5, 2016), which is hereby incorporated herein by reference in its entirety.

FIELD OF THE DISCLOSURE

This disclosure relates generally to mobile networks and, more particularly, to methods and apparatus to configure virtual private mobile networks for security.

BACKGROUND

Virtualization of computing and networking platforms is becoming popular with clients and customers by providing flexible, on demand resources at a relatively low cost. A virtualized computing network, also known as a cloud computing network, enables clients to manage web-based applications and/or data resources by dynamically leasing computational resources and associated network resources from service providers. These web-based applications, data resources, and/or routing resources may be used by customers of the clients, individuals associated with the clients, and/or by the clients. This dynamic leasing of computational and network resources creates an appearance and function of a distributive computing network and, thus, is referred to as virtualization of a network. Virtualized platforms utilize partitioning and allocation of network and/or computing resources. Accordingly, new resources provisioned for a client may be added quickly as needed within short periods of time by a network provider allocating an additional portion of shared resources to the client. Additionally, virtualization in a network enables network providers to dynamically multiplex resources among multiple clients without dedicating individual physical resources to each client.

DETAILED DESCRIPTION

Figure 1:
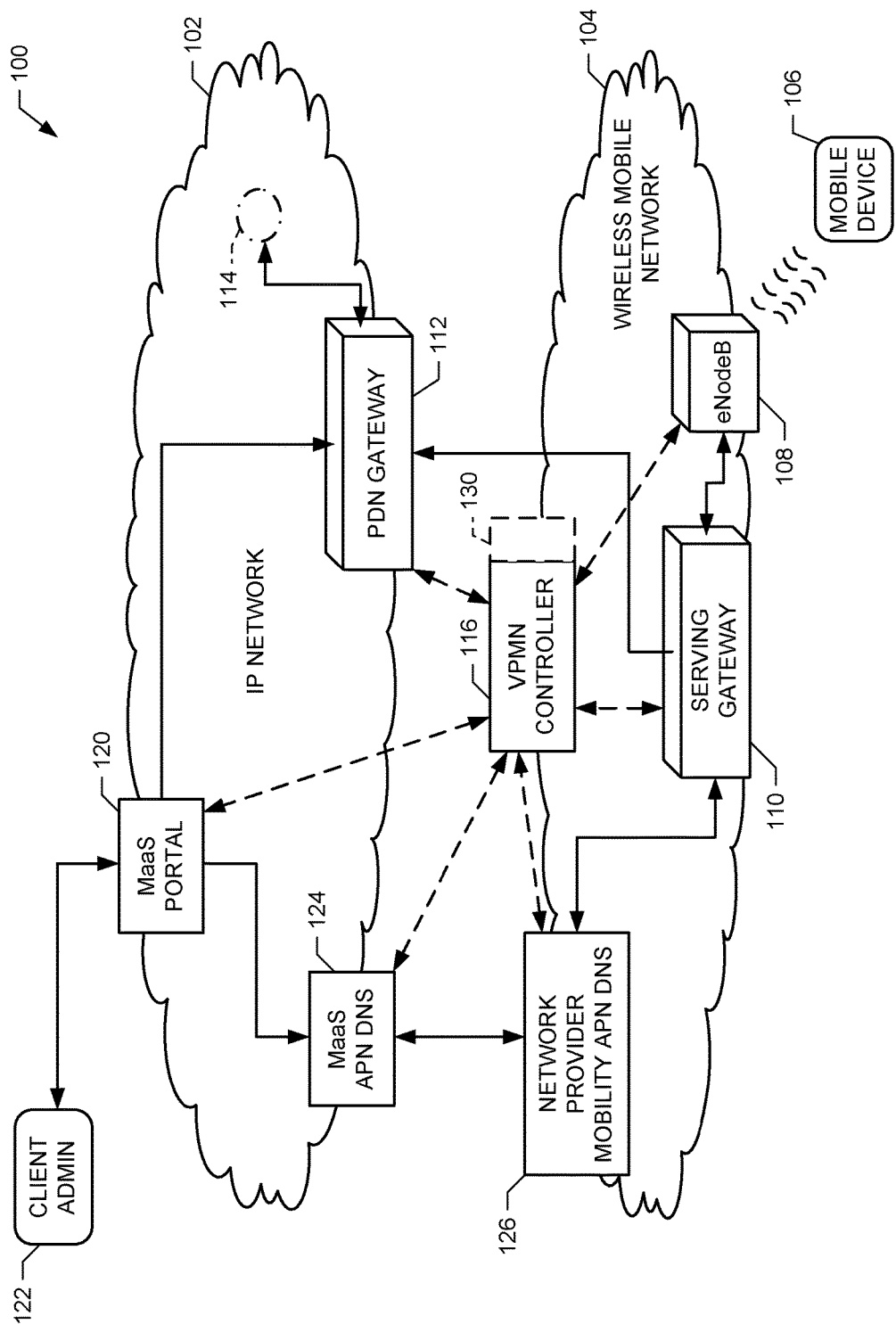
FIG. 1 is a schematic illustration of an example communication system including a wireless mobile network and a virtual private mobile network controller with a security processor.

Example methods, articles of manufacture, and apparatus to configure virtual private mobile networks for security are disclosed. A disclosed example method includes identifying, in a wireless network, a communication from a user equipment that matches a security event profile. The example method also includes transmitting, from the wireless network, an instruction to enable the user equipment to be communicatively coupled to a virtual private mobile network, the virtual private mobile network being provisioned for security within the wireless network. The example method further includes enabling the user equipment to transmit a second communication through the virtual private mobile network securely isolated from other portions of the wireless network.

A disclosed example apparatus includes a security processor to identify, in a wireless network, communications from a user equipment that are a potential threat to the wireless network, the communications matching a security event profile. The example security processor also is to provision logically within the wireless network a virtual private mobile network to process the communications associated with the potential threat. The example apparatus further includes a device migrator to communicatively couple the user equipment to the virtual private mobile network.

Currently, wireless mobile networks enable subscribing customers to connect to an external packet switched network (e.g., the Internet) via mobile devices. These wireless mobile networks provide wireless network service via dedicated hardware (e.g., network elements also known as mobility network elements). In many instances, network elements are configured for a corresponding wireless communication protocol. Throughout the following disclosure, reference is made to network elements associated with the 3rd Generation Partnership Project (3GPP) Long Term Evolution (LTE) wireless communication standard. However, the disclosure is applicable to network elements associated with other wireless protocols and/or standards such as, for example, the General Packet Radio Service (GPRS) for second generation (2G) and Wideband-Code Division Multiple Access (W-CDMA) based third generation (3G) wireless networks.

In a typical wireless mobile network, a base transceiver station (BTS) (e.g., an LTE eNodeB) provides wireless communication service for mobile devices in a cell (e.g., a geographic area). The BTS enables one or more wireless devices to connect to an external packet switched network through the wireless mobile network. In these typical wireless mobile networks, a BTS is communicatively coupled to a serving gateway (e.g., a wireless network interface, router, and/or server), which routes communications between multiple BTSs and a packet data network (PDN) gateway. The PDN gateway is an interface between the wireless mobile network and external packet switched networks. In other GPRS-based wireless mobile networks, the serving gateway provides similar functionality to a Serving GPRS Support Node (SGSN) and the PDN gateway provides similar functionality to a Gateway GPRS Support Node (GGSN).

Additionally, many wireless mobile networks include a mobility management entity (MME) that monitors mobile devices on a wireless mobile network and coordinates wireless handoffs between BTSs for the mobile devices.

Wireless mobile networks also include home subscriber servers (HSS) (e.g., a home location register (HLR) that mange wireless device profiles and/or authentication information. Collectively, BTSs, HSSs, HLRs, PDN gateways, and/or serving gateways are referred to as network elements, which provide a foundation for providing wireless communication services for mobile devices.

To implement a wireless mobile network, a wireless mobile network provider manages and/or configures network elements. The wireless mobile network enables customers of a wireless mobile network provider to subscribe to the wireless mobile network to receive and/or transmit voice and/or data communications. Many network providers configure network elements to provide wireless service to any subscribing customer of the network provider. For example, subscribing customers of a network provider may commonly access a wireless mobile network managed by the network provider.

Additionally, many network providers lease portions of their wireless mobile network to mobile virtual network operators (MVNOs). An MVNO (e.g., Virgin Mobile) is a company that provides mobile device services but does not own, control, and/or manage its own licensed frequency allocation of a wireless spectrum and/or does not own, control, and/or manage network elements needed to create a wireless mobile network. Network elements are capital intensive, which results in many MVNOs desiring to avoid the relatively large costs of creating and maintaining a wireless mobile network. To provide mobile device services, an MVNO leases bandwidth and/or portions of a wireless spectrum for subscribing customers of the MVNO. In this manner, an MVNO may compete with a wireless mobile network provider for customers but use the same wireless mobile network managed by the wireless mobile network provider.

In other instances, an MVNO may be a relatively large business and/or government entity that leases a portion of a wireless mobile network for private and/or proprietary use. For example, a military may lease a portion of a wireless mobile network. In these other instances, employees, agents, and/or contractors of the MVNO use the leased portion of the wireless mobile network to communicatively couple to data centers and/or computing elements managed by the MVNO.

Currently, many wireless mobile network providers use dedicated network elements to manage wireless communications for an MVNO. These dedicated network elements are often separate from network elements used by subscribing customers of the network provider. In other instances where it may not be efficient to provide dedicated network elements for an MVNO, a wireless mobile network provider shares network resources with an MNVO. However, this sharing may result in security issues as compromises and/or denial of service attacks on an MVNO service can affect wireless service provided by the network provider. In other words, an issue with a portion of a wireless mobile network for an MVNO can develop into a larger issue for the wireless mobile network provider. Additionally, sharing and/or creating individual network resources with an MVNO creates a relatively inflexible wireless mobile network that makes realization of varying service differentiating features a difficult task for a wireless mobile network provider.

The example methods, apparatus, and articles of manufacture described herein configure a wireless mobile network for security by partitioning network elements to create a virtual private mobile network (VPMN) to process and/or route unsecure, suspect, and/or otherwise high risk communications (e.g., problematic or potentially threatening communications). The example methods, apparatus, and articles of manufacture described herein determine problematic communications (e.g., security events) within a wireless mobile network by identifying which communications match a security event profile. For example, security event profiles may specify a known network worm, a known malicious application, and/or a known unsecure and/or unsupported mobile device. An unsecure mobile device includes a mobile device that does not have security updates and/or network security protection. An unsupported mobile device includes a mobile device that is modified to operate on a wireless mobile network where the mobile device would not otherwise be able to communicatively couple to the wireless mobile network (e.g., a jail broken mobile device). A malicious application includes an application that reduces network performance by generating excessive traffic. A network worm can include any malicious program and/or code that is embedded within a payload of network communications configured to disrupt network performance and/or penetrate network safeguards.

The example methods, apparatus, and articles of manufacture described herein use identified potentially problematic communications to identify mobile devices associated with the communications. The example methods, apparatus, and articles of manufacture described herein then provision the identified mobile devices to communicatively couple to a VPMN designated for security that is logically separate from a wireless mobile network. In this manner, the example methods, apparatus, and articles of manufacture described herein isolate potentially problematic communications from a wireless mobile network.

A VPMN provides private network communications on shared network elements. In some instances, a VPMN may extend end-to-end on a wireless mobile network. In other instances, a VPMN may only be included within some network elements and/or some types of network elements. To partition (e.g., virtualize) many network elements, portions of a control plane and/or a data plane of the network elements are partitioned for a particular VPMN. Partitioning network elements may also include partitioning processing power and/or bandwidth of the network elements for a particular VPMN to separate the VPMN from other portions of a wireless mobile network. Virtualizing VPMNs in a wireless mobile network enables the VPMNs to provide a private secure virtual circuit (and/or a private path using similar technology such as, for example, a Multiprotocol Label Switching (MPLS) path) extending from mobile devices to an external packet switched network, other mobile devices, and/or data centers of an MVNO.

An example VPMN designated for security routes and/or processes potentially problematic and/or threatening communications through a wireless mobile network separate from non-potentially problematic communications. Additionally, the example VPMN may include security protocols and/or security tools that are not implemented in a wireless mobile network for communications that are not potentially problematic. The security protocols and/or analysis tools analyze, diagnose, filter, block, and/or monitor potentially problematic communications and/or identified problematic communications. Thus, the example methods, apparatus, and articles of manufacture described herein conserve wireless mobile network resources by only using additional security protocols and/or security tools within the example VPMN without having to deploy the additional security protocols and/or tools to other portions of the wireless mobile network. For example, deploying an additional security protocol may increase a propagation time because the security protocol has to analyze the problematic communications. By having the additional security protocol deployed only within the secure VPMN, only propagation times of potentially problematic communications are affected.

Through the use of separate isolated VPMNs, the example methods, apparatus, and articles of manufacture described herein provide enhanced security. Thus, a compromise on a first VPMN and/or a wireless mobile network cannot propagate to other VPMNs because the VPMNs are logically separate. As a result of enhanced security, some MVNOs with relatively more stringent security requirements can utilize VPMNs without implementing other security protocols and/or methods.

In the interest of brevity and clarity, throughout the following disclosure, reference will be made to an example communication system 100 of FIG. 1 associated with the LTE standard. However, the methods, articles of manufacture, and apparatus described herein to configure virtual private mobile networks are applicable to other types of networks constructed using other network technologies, topologies and/or protocols.

FIG. 1 illustrates the example communication system 100 that includes an Internet Protocol (IP) network 102 (e.g., an external packet switched network, the Internet, X.25, a WiMax network, etc.) and a wireless mobile network 104. The IP network 102 includes any number and/or types of routers, switches, servers, etc. to enable communications (e.g., packet-based data). The IP network 102 utilizes and/or conforms to any routing and/or communication protocols. The example wireless mobile network 104 (e.g., wireless network) includes any network for routing and/or managing communications between the IP network 102 and mobile devices (e.g., mobile device 106).

In the illustrated example, the wireless mobile network 104 is shown as including and/or associated with network elements 108-112. The example network elements 108-112 are shown as one example of communicatively coupling the mobile device 106 to the IP network 102. In other examples, the wireless mobile network 104 can include additional network elements and/or different types of network elements including, for example, an MME, an HSS, and/or a policy charging and rules function (PCRF) server. Further, the example network elements 108-112 correspond to the LTE standard. In other examples, the network elements 108-112 may be associated with any other wireless communication protocol and/or standard including, for example, Universal Mobile Telecommunication System (UMTS) and/or GPRS.

The example mobile device 106 (e.g., user equipment (UE)) of the illustrated example includes any device capable of wirelessly communicatively coupling to the wireless mobile network 104. For example, the mobile device 106 includes any laptop, smartphone, computing pad, personal digital assistant, tablet computer, personal communicator, etc. Additionally, while FIG. 1 shows the mobile device 106, in other examples, the communication system 100 may include additional mobile devices.

To wirelessly connect to the wireless mobile network 104, the wireless mobile network 104 includes the eNodeB 108. The example eNodeB 108 is a BTS (e.g., an access point) and includes any controllers, transmitters, receivers, and/or signal generators to provide a wireless spectrum to facilitate wireless communication with, for example, the mobile device 106. The eNodeB 108 transforms communications received from the serving gateway 110 into a wireless signal transmitted to the mobile device 106. Similarly, the eNodeB 108 transforms wireless communications received from the mobile device 106 into a wired communications that may be routed to the IP network 102.

To route communications to and/or from the eNodeB 108, the wireless mobile network 104 of FIG. 1 includes the serving gateway 110. The example serving gateway 110 routes and/or forwards communications (e.g., data packets) between the PDN gateway 112 and mobile devices that are within a geographical area assigned to the serving gateway 110. Location registers within the example serving gateway 110 store location information including, for example, a geographic location of the eNodeB 108, visitor location register (VLR) information, and/or user profile information of the mobile device 106. The example serving gateway 110 may also provide authentication and/or charging functions to enable the mobile device 106 to access the wireless mobile network 104.

The example serving gateway 110 also functions as a mobility anchor for a user plane during inter-eNodeB handovers of the mobile device 106. In other words, the serving gateway 110 ensures the mobile device 106 is connected to an eNodeB when the mobile device 106 moves to a different physical location. The example serving gateway 110 further manages and stores contexts (e.g. parameters of the IP wireless mobile network, security events, and/or network internal routing information) associated with the mobile device 106. While the wireless mobile network 104 of FIG. 1 shows the single serving gateway 110, the wireless mobile network 104 may include additional serving gateways.

To interface with the IP network 102 of the illustrated example, the example wireless mobile network 104 is associated with the PDN gateway 112. In this example, the PDN gateway 112 is communicatively coupled to the IP network 102 via an interface 114. The example PDN gateway 112 functions as a router by routing communications from the wireless mobile network 104 to an appropriate edge and/or network router within the IP network 102. Also, the PDN gateway 112 routes communications directed to the mobile device 106 from the IP network 102 to an appropriate serving gateway (e.g., the gateway 110). In some examples, the PDN gateway 112 may determine if the mobile device 106 is active (e.g., available to receive the communications) by sending a query to the serving gateway 110. If the serving gateway 110 indicates the mobile device is active 106, the serving gateway 110 sends a response to the PDN gateway 112 causing the PDN gateway 112 to forward the communications to the serving gateway 110. If the mobile device 106 is inactive and/or unavailable, the PDN gateway 112 may discard the communications and/or query other serving gateways in the wireless mobile network 104.

In some examples, the PDN gateway 112 transforms and/or converts communications originating from the mobile device 106 received via the serving gateway 110 into an appropriate packet data protocol (PDP) format (e.g., IP, X.25, etc.) for propagation through the IP network 102. Additionally, for communications received from the IP network 102, the PDN gateway 112 converts the communications into a wireless protocol (e.g., 3GPP LTE, Global System for Mobile Communications (GSM), etc.). The example PDN gateway 112 then readdresses the communications to the corresponding serving gateway 110.

To configure VPMNs on the network elements 108-112, the wireless mobile network 104 includes a VPMN controller 116. The example VPMN controller 116 receives requests from the network elements 108-112 to create a VPMN (e.g., a security VPMN) to isolate potentially problematic communications (and/or identified problematic communications) originating from, for example, the mobile device 106. The example VPMN controller 116 may also receive requests from clients (e.g., MVNOs) for VPMNs. To create a VPMN, the example VPMN controller 116 identifies available portions of the network elements 108-112 for the requested VPMNs, and partitions control and/or data plane space on the network elements 108-112 to configure the VPMNs. In some examples, the VPMN controller 116 may also configure the mobile device 106 to access a VPMN.

To receive requests for a VPMN, the example communication system 100 of FIG. 1 includes a Mobility-as-a-Service (Maas) portal 120. The MaaS portal 120 enables clients to specify requirements (e.g., security rules) for a VPMN. In some examples, the MaaS portal 120 may be an interface of the VPMN controller 116 that a client accesses via the IP network 102. In other examples, the client may directly access the VPMN controller 116.

In the illustrated example, a client administrator 122 (e.g., a client) accesses the MaaS portal 120 to request a VPMN. The request for a VPMN may include a list of mobile devices that are to be authorized to access the VPMN, an estimated maximum and/or average amount of bandwidth to be utilized, a geographic location for the VPMN (including a geographic location of the eNodeB 108 and/or the serving gateway 110), administrative information, billing information, security event profiles, and/or any other information that may be needed to provision a VPMN.

In response to the client administrator 122 requesting a VPMN, the MaaS portal 120, via the VPMN controller 116, establishes a VPMN through the network elements 108-112. Examples of VPMNs are described below in conjunction with FIGS. 2-5. To enable mobile devices associated with the client administrator 122 to access the newly created VPMN, the VPMN controller 116 assigns the VPMN an access point name (APN). The APN enables communications from identified mobile devices to be routed through the wireless mobile network 104 via a VPMN.

An APN identifies a PDN that a mobile device requests to communicatively couple. The APN may also define a type of service, server, and/or multimedia message service that is provided by a PDN. Typically, an APN includes a network identifier and an operator identifier. The network identifier may define an external network to which the PDN gateway 112 is connected (e.g., the IP network 102). The operator identifier specifies which network (e.g., VPMN) is associated with the PDN gateway 112. In the example of FIG. 1, the VPMN controller 116 uses operator identifiers of APNs to identify to which VPMN communications from a mobile device are to be routed.

The example VPMN controller 116 of the illustrated example transmits an assigned APN to subscribing customers identified to be communicatively coupled to a VPMN. The VPMN controller 116 also registers the APN with APN domain name system (DNS) servers 124 and 126 within the respective networks 102 and 104. Registering the APN with the APN DNS servers 124 and 126 enables communications associated with a VPMN to be routed to the appropriate VPMN on the network elements 108-112 when the VPMN controller 116 is unable to extend the VPMN from end-to-end (e.g., from the eNodeB 108 to the interface 114 of the PDN gateway 112). Thus, the use of APNs enables the VPMN controller 116 to provision a VPMN over a portion of the network elements 108-112 when other network elements are not capable and/or are not configured to host the VPMN.

To determine which communications from, for example, the mobile device 106 are potentially problematic and/or threatening to the wireless mobile network 104, the example VPMN controller 116 of FIG. 1 includes a security processor 130. The example security processor 130 stores security rules for the wireless mobile network 104 that include security event profiles that specify security events associated with potentially problematic communications. The security event profiles may be specified by, for example, the client administrator 122, and/or an operator of the wireless mobile network 104. In other examples, the example security processor 130 may compile and/or aggregate security event profiles based on previously detected security events.

The example security processor 130 transmits the security rules to each of the VPMNs implemented on the network elements 108-112. The security processor 130 may also transmit the security rules to the network elements 108-112 in instances where the network elements 108-112 process communications separate from a VPMN. In some instances, the security processor 130 may transmit different sets of security rules to different VPMNs based on instructions from, for example, the client administrator 122. For example, some client administrators may only be concerned with malicious network worms and denial of service attacks for their respective VPMNs while other client administrators are concerned with malicious applications, unsupported mobile devices, and/or unsecure mobile devices for their respective VPMNs.

The example VPMNs and/or the network elements 108-112 use the security rules to identify potentially problematic communications (e.g., security events). In other examples, the security processor 130 may monitor VPMNs and/or the network elements 108-112 for potentially problematic communications. After detecting potentially problematic communications, the VPMNs and/or the network elements 108-112 broadcast information about the security event and/or an identifier of a mobile device associated with the security event to other VPMNs and/or the security processor 130. The VPMNs and/or the security processor 130 may then determine if, for example, the mobile device 106 is associated with other potentially problematic communications and transmits those identified security events.

The example security processor 130 and/or the VPMNs of the illustrated example use the information regarding the security event to provision, for example, the mobile device 106 to a VPMN designated for security (e.g., a security VPMN). In some instances, the example network elements 108-112 may have a VPMN for security provisioned. In other examples, the security processor 130 provisions a VPMN after a security event is detected. The example security processor 130 and/or a VPMN that detected the security event communicatively couples the mobile device 106 to the security VPMN. To communicatively couple the mobile device 106, the example security processor 130 and/or the detecting VPMN uses over the air programming to send an APN of the security VPMN to the mobile device. In some examples, the over the air programming may include provisioning a subscriber identity module (SIM) card of the mobile device 106 with an APN corresponding to the security VPMN.

The example security VPMN processes and/or routes communications from the mobile device 106. In some instances, the security VPMN may analyze the communications to identify the security event and determine a resolution (e.g., a defense strategy) to the security event. In other examples, the security VPMN may propagate the communications associated with the mobile device 106 through the wireless mobile network 104 to the IP network 102 separate and/or isolated from other communications from other mobile devices. After resolving the security event, the security VPMN and/or the security processor 130 migrates the mobile device 106 to an originally connected VPMN and/or to the general non-VPMN portions of the network elements 108-112.

While the above described example involves creating a general security VPMN for any detected security event, the example security processor 130 of FIG. 1 may create different security VPMNs for different types of security events. For example, a first security VPMN may be created specifically for network worms and/or viruses and include security tools for analyzing and/or blocking the worms and/or viruses. Additionally, a second security VPMN may be created for malicious applications and include processing and/or routing protocols configured to limit excessive signing traffic generated by the applications.

Figure 2:
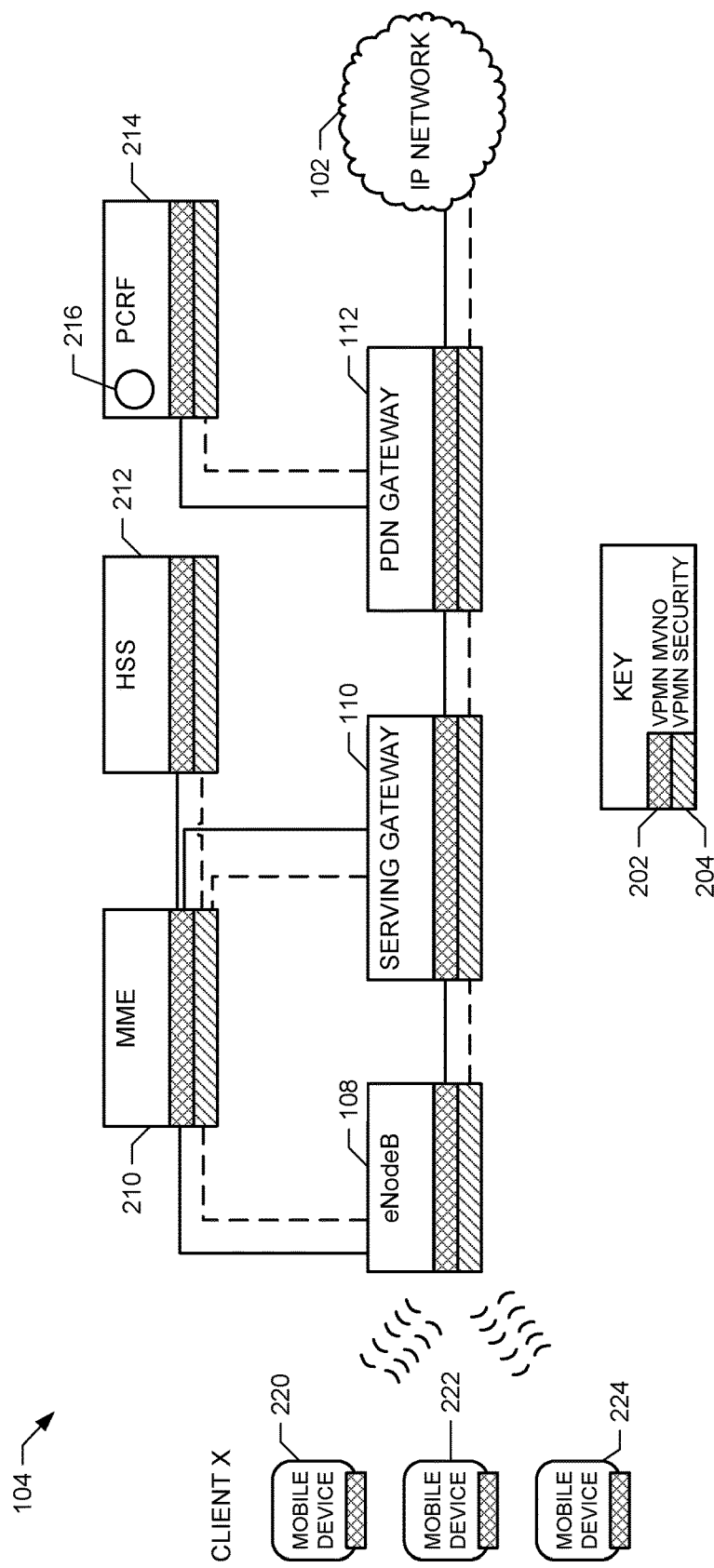
FIGS. 2-5 illustrate the example wireless mobile network of FIG. 1 with example virtual private mobile networks for security.
Figure 3:
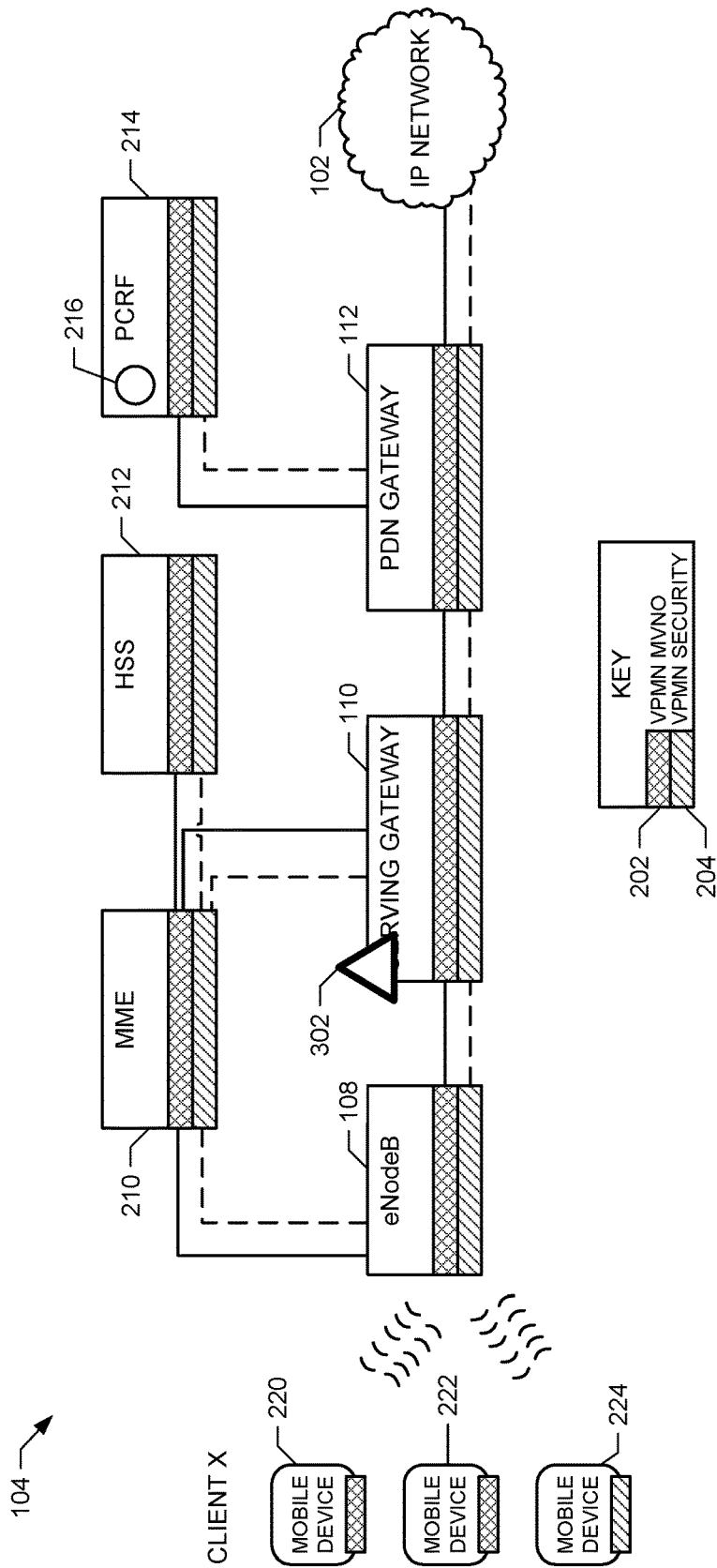
Figure 4:
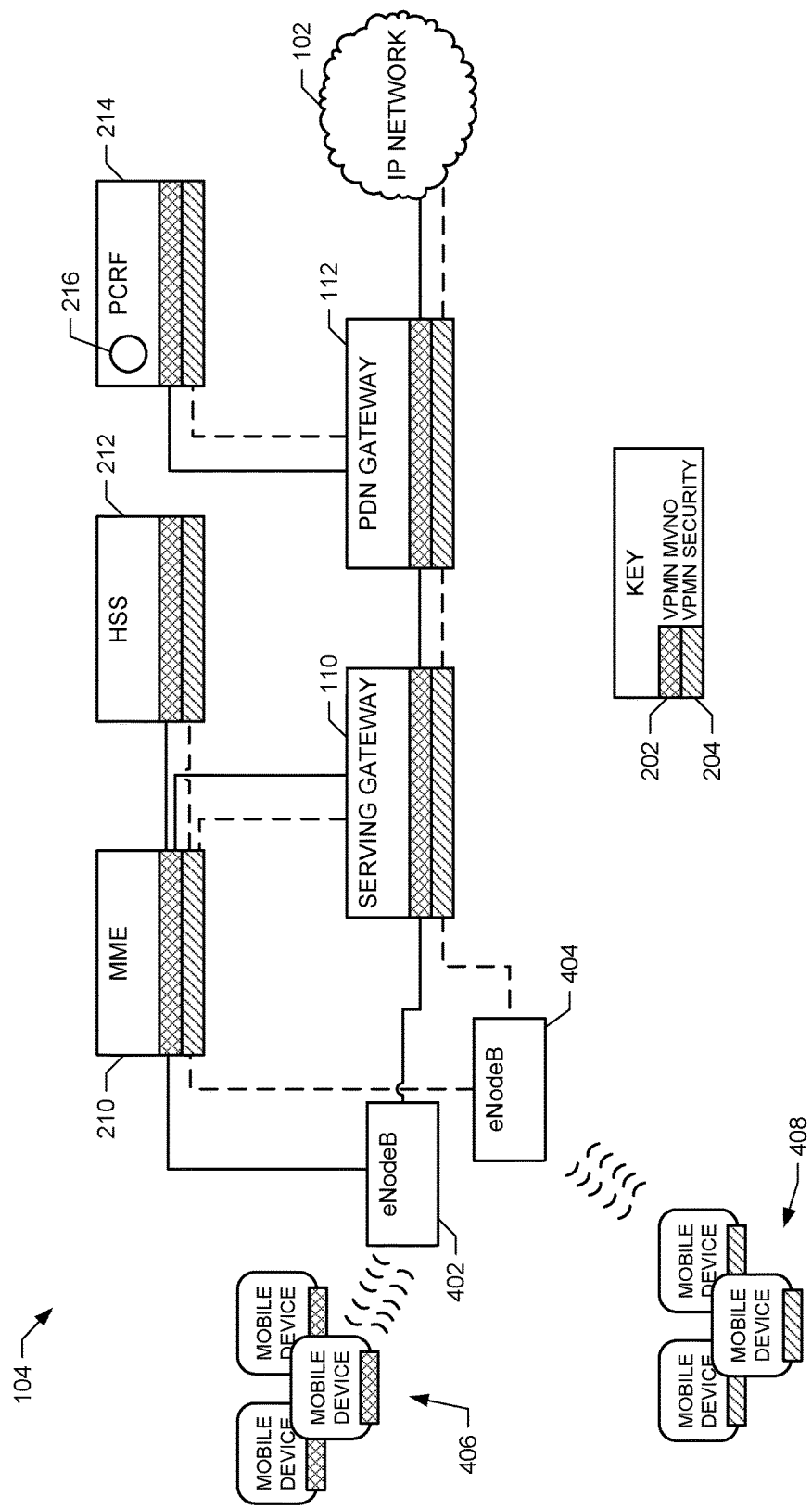

FIGS. 2-4 show the example wireless mobile network 104 of FIG. 1 with VPMNs 202 and 204. In these illustrated examples, the VPMN 202 is associated with and/or configured for a Client X and the VPMN 204 is designated for security (e.g., a security VPMN). In other examples, the wireless mobile network 104 may include additional VPMNs or fewer VPMNs.

In the example of FIG. 2, the wireless mobile network 104 includes the network elements 108-112 of FIG. 1. Additionally, the wireless mobile network 104 includes an MME 210, an HSS 212, and a PCRF server 214. In other examples, the wireless mobile network 104 may include additional network elements and/or additional types of network elements.

The example MME 210 tracks and pages mobile devices that are communicatively coupled to the wireless mobile network 104. The example MME 210 may also activate and/or deactivate mobile devices and/or authenticate mobile devices attempting to connect to the wireless mobile network 104 by requesting user profile information from the HSS 212. In some examples, the MME 210 may be similar to the servers 124 and 126 of FIG. 1 by selecting the appropriate serving gateway 110 and/or PDN gateway 112 when mobile devices provide an APN to connect to one of the VPMNs 202 and 204.

The example HSS 212 of FIG. 2 includes a database of subscription-related information (e.g., subscribing customer profiles). The example HSS 212 performs authentication and/or authorization of a mobile device attempting to access the wireless mobile network 104 by providing the MME 210 with mobile device profile information to match to profile information by the requesting mobile device. The HSS 212 may also include information about a geographic location of a subscribing customer and/or IP information associated with a mobile device of the customer.

The example PCRF server 214 determines policy rules for the wireless mobile network 104. The example PCRF server 214 aggregates information to and/or from the wireless mobile network 104 and/or the network elements 108-112, 210, and 212 in real time to create rules. The example PCRF 214 may also store security rules 216 that include security event profiles. Based on the created rules, the PCRF server 214 automatically makes intelligent policy decisions for each mobile device active on the wireless mobile network 104. In this manner, the PCRF server 214 enables a wireless mobile network provider to offer multiple services, quality of service (QoS) levels, and/or charging rules. Additionally, the PCRF server 214 may also broadcast and/or transmit the security rules to the portions of the network elements 108-112, 210 and 212 hosting the VPMNs 202 and 204.

In the example of FIG. 2, the Client X requests the VPMN 202 from the VPMN controller 116 of FIG. 1 to enable mobile devices 220-224 to subscribe to a service offered by the Client X to connect to the IP network 102. The example Client X may also specify the security rules 216 for identifying potentially problematic and/or threatening communications within the VPMN 202. In this example, the Client X may be an MVNO.

In this illustrated example, the Client X requests that the VPMN 202 extend end-to-end of the wireless mobile network 104. As a result of the request, the VPMN controller 116 extends the VPMN 202 to all of the network elements 108-112 and 210-214 within the wireless mobile network 104. In other examples, the Client X may only request and/or may only be able to request a VPMN to be setup on some of the network elements 108-112 and 210-214. By requesting the VPMN 202, the example VPMN controller 116 identifies available space within the network elements 108-112 and 210-214 and allocates control and/or data planes of the network elements 108-112 and 210-214 for the VPMN 202. The VPMN controller 116 then configures the allocated control and/or data plane portions of the network elements 108-112 and 210-214 for the VPMN 202.

To configure the network elements 108-112 and 210-214, the example VPMN controller 116 may assign an APN to the VPMN 202 and update a control plane of the network elements 108 and 210-214 with the APN assignment. The VPMN controller 116 may also assign and/or configure specific interfaces, switches, and/or processors within the network elements 108-112 and 210-214 to host the VPMN 202.

The mobile devices 220-224 use the assigned APN to access the respective VPMN 202. Further, by using the APN, the network elements 108-112 and 210-214 may propagate communications within the VPMN 202 until an end point is reached. By using APNs, the example VPMN controller 116 creates exclusive virtual circuits (e.g., MPLS paths) from the eNodeB 108 to the PDN gateway 112 for routing communications within the VPMN 202 for the mobile devices 220-224 registered with the Client X MVNO. Thus, the APNs ensure that communications from the mobile devices 220-224 are routed through the wireless mobile network 104 via the VPMN 202.

Further, the VPMN 202 partitioned within the network elements 210-214 enables access control, authentication, mobile device profile management, security event profiles, and/or network rules to be configurable for the Client X. Thus, subscriber information for the Client X within the HSS 212 is separate from subscriber information associated with other VPMNs (not shown) and/or subscribers that use non-VPMN portions of the network elements 108-112 and 210-214. The separation of the control and/or data planes of the network elements 210-214 via the VPMN 202 also enables the Client X to provide different types of services using the same network elements 108-112 and 210-214. Further, the separation of the control and/or data planes of the network elements 210-214 via the VPMN 202 prevents security issues in, for example, the VPMN 202 from propagating to other portions of the network elements 108-112 and 210-214.

The example wireless mobile network 104 of FIG. 2 also includes the security VPMN 204 within the network elements 108-112 and 210-214. In other examples, the security VPMN 204 may be included only within some of the network elements 108-112 and 210-214. In this example, the security VPMN 204 is provisioned for the Client X as a VPMN to process potentially problematic and/or threatening communications detected within the VPMN 202. When there are relatively few potentially problematic communications to process, the example security VPMN 204 may allocate relatively less bandwidth and/or processing capacity from among the network elements 108-112 and 210-214 compared to bandwidth and/or processing capacity allocated for the VPMN 202.

FIG. 3 shows the example wireless mobile network 104 of FIG. 2 detecting a security event 302. In this example, the serving gateway 110 detects the security event 302 within the VPMN 202 associated with the Client X. The security event 302 may include a virus within a data payload and/or a network worm. The security event 302 may also include an unsupported and/or unsecure mobile device and/or a malicious and/or defective application. The example serving gateway 110 identifies the security event 302 using the security rules 216 provided by, for example, the PCRF server 214 and specified by, for example, the Client X. The example serving gateway 110 may also detect the security event 302 by matching information associated with the potentially problematic communication to subscriber information within the HSS 212. Alternatively, the detection of the security event can occur at the PDN gateway 112 and/or external to the VPMN 202 by observing traffic exiting the wireless mobile network 104. This detection may provide feedback to the VPMN controller 116 regarding the security event based on detection results.

After detecting the security event 302, the example serving gateway 110 transmits information regarding the security event 302 to the other network elements 108, 112, and 210-214. The serving gateway 110 may also transmit the information to the example security processor 130 within the example VPMN controller 116. The serving gateway 110 may communicate with the other network elements 108, 112, and 210-214, the VPMN controller 116, and/or any other VPMNs (not shown) via a controlled interface (e.g., an application programming interface (API)). The transmission of the security event information causes the network elements 108, 112, and 210-214 to determine if any potentially problematic communications that match the security event are included within their respective portions of the VPMN 202. The example serving gateway 110 and/or the network elements 108, 112, and 210-214 may use the security event information to identify, for example, that the mobile device 224 is associated with (e.g., originated) the potentially problematic communications.

To communicatively couple the mobile device 224 to the security VPMN 204, the example serving gateway 110 sends the mobile device 224 an APN that corresponds to the security VPMN 204. For example, the serving gateway 110 may provision a SIM card of the mobile device 224 with the APN. Further, the example serving gateway 110 may broadcast the provisioning of the mobile device 224 to the security VPMN 204 so that the network elements 108, 112, and 210-214 route and/or process communications associated with the mobile device 224 through the security VPMN 204 using the newly assigned APN.

Once the mobile device 224 is communicatively coupled to the security VPMN 204, additional security protocols and/or analysis tools may determine specific information regarding the security event 302 and/or the potentially problematic communications. The security protocols and/or analysis tools may be used to determine an appropriate strategy for the mobile device 224. For example, the VPMN 204 may send a message to a user of the mobile device 224 that the mobile device 224 has been provisioned for the security VPMN 2404 and provide actions to be completed (e.g., removing a malicious application, removing modifications from the mobile device 224, installing a security upgrade, and/or deleting a network worm) before the mobile device 224 can be provisioned for the VPMN 202. In other instances, the security protocols and/or the analysis tools of the security VPMN 204 may resolve the security event 302. In yet other instances, the security protocols and/or analysis tools of the security VPMN 204 may monitor communications associated with the mobile device 224 to determine if other security events occur. Further, the example security VPMN 204 may continue to isolate communications associated with the mobile device 224 from the VPMN 202 until the mobile device 224 is removed from service.

The security protocols deployed within the security VPMN 204 may increase a propagation time of communications between the mobile device 224 and, for example, the IP network 102. However, the example security VPMN 204 ensures that potentially problematic and/or threatening communications associated with the mobile device 224 cannot affect other communications associated with, for example, the mobile devices 220 and 222 communicatively coupled to the VPMN 202. In this manner, the example Client X only needs to deploy and/or utilize additional security protocols within the portions of the network elements 108-112 and 210-214 provisioned to host the security VPMN 204, thereby reducing protocols configured for the VPMN 202. By not having to implement additional protocols for the VPMN 202, communication propagation times through the VPMN 202 and/or processing capacity allocated for the VPMN 202 can be reduced. In other words, the additional protocols are only implemented in the relatively smaller security VPMN 204 configured specifically to process the potentially problematic communications.

FIG. 4 shows the example wireless mobile network of FIGS. 1-3 with the example VPMNs 202 and 204. In this example, the eNodeB 108 of FIGS. 1-3 is replaced with eNodeBs 402 and 404. The example eNodeB 402 is communicatively coupled to the example VPMN 202 and the example eNodeB 404 is communicatively coupled to the example security VPMN 204. Thus, FIG. 4 shows that each of the VPMNs 202 and 204 can be communicatively coupled to the physically separate eNodeBs 402 and 404, which are both coupled to respective portions of the serving gateway 110.

The example eNodeBs 402 and 404 of the illustrated example are physically separate to create isolation in a wireless spectrum between the VPMNs 202 and 204. Thus, mobile devices 406 provisioned for the VPMN 202 are communicatively coupled to the example eNodeB 402 and mobile devices 408 provisioned for the security VPMN 204 are communicatively coupled to the example eNodeB 404. In this example, the mobile devices 408 may be associated with identified potentially problematic communications. Specifically, the example mobile devices 408 may operate a malicious and/or problematic application. To protect the VPMN 202 from the malicious applications, the example VPMN controller 116, the example security processor 130, and/or the network elements 110, 112, 210-214, and/or 402 may migrate the mobile devices 408 to the security VPMN 204. To communicatively couple the mobile devices 408 to the eNodeB 404, the example serving gateway 110 may transmit an APN to the mobile devices 408 that corresponds to the security VPMN 204.

Figure 5:
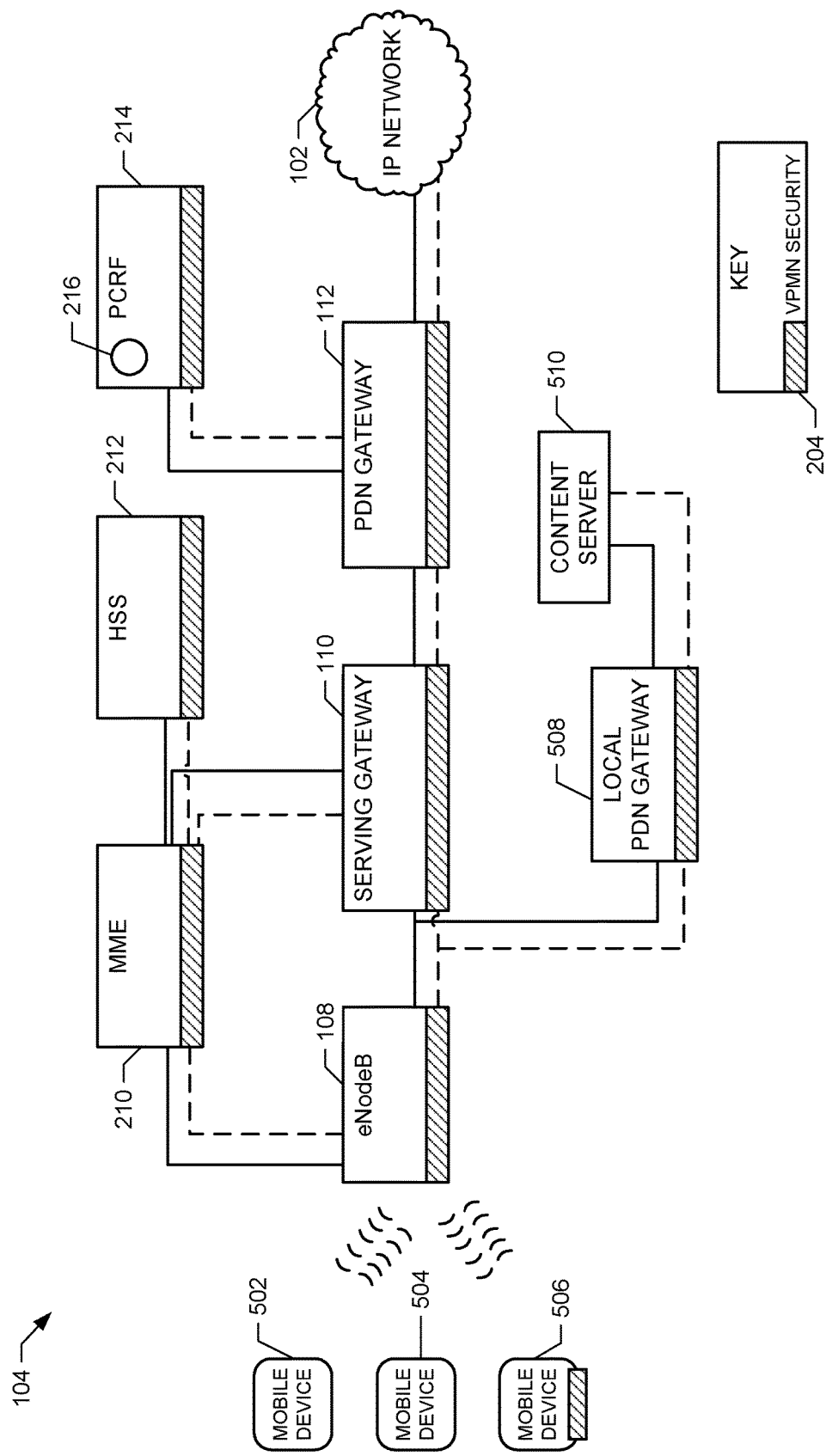

FIG. 5 shows the example wireless mobile network 104 of FIGS. 1-4 with the example security VPMN 204. In this example, a network provider routes and/or processes communications from mobile devices (e.g., mobile devices 502-506) via the example network elements 108-112 and 210-214 without a VPMN (e.g., the VPMN 202). The network provider uses the example security VPMN 204 to route and/or process potentially problematic communications separate from other communications. Thus, in this example, the example security VPMN 204 is logically partitioned within the network elements 108-112 and 210-214 separate from non-VPMN portions of the network elements 108-112 and 210-214.

In the illustrated example, the example mobile devices 502 and 504 are communicatively coupled to the wireless mobile network 104 via the network elements 108-112 and 210-214. Additionally, the mobile device 506 is communicatively coupled to the wireless mobile network 104 via the security VPMN 204 provisioned within the network elements 108-112 and 210-214. In this example, the mobile device 506 is identified as being associated with potentially problematic communications.

The example of FIG. 5 also includes a local PDN gateway 508 and a communicatively coupled content server 510. The example local PDN gateway 508 is included within the example wireless mobile network 104 and communicatively coupled to the serving gateway 110. Additionally, the security VPMN 204 is provisioned within the local PDN gateway 508 to enable the wireless device 506 to access the content server 510.

The example local PDN gateway 508 may be utilized within the example wireless mobile network 104 to reduce propagation times of communications between, for example, the mobile devices 502-506 and the content server 510. In many wireless networks, the example PDN gateway 112 can be located thousands of miles from the serving gateway 110. Thus, the mobile devices 502-506 that communicate with entities reachable via the IP network 102 may have to transmit communications a thousand miles to reach the PDN gateway 112 and possibly another thousand miles to reach a destination. The example local PDN gateway 508 is deployed relatively physically close to the content server 510.

In the illustrated example, the local PDN gateway 508 may include many of the functions of the PDN gateway 112, as described in conjunction with FIG. 1. However, because the local PDN gateway 508 processes relatively fewer communications targeted only for the content server 510 (and/or a group of physically close content servers), the example local PDN gateway 508 may have relatively lower processing capacity compared to the PDN gateway 112. In this example, the example serving gateway 110 receives communications from the mobile devices 502-504, determines the communications are addressed to the content server 510, and routes the communications to the local PDN gateway 508. Similarly, the example security VPMN 204 within the serving gateway 110 routes communications from the mobile device 506 with a destination of the content server 510 to the security VPMN 204 within the local PDN gateway 508. In other instances, the security VPMN 204 may block communications from the mobile device 506 from accessing the content server 510, thereby preventing the communications from affecting the content server 510.

Figures 6, 7:
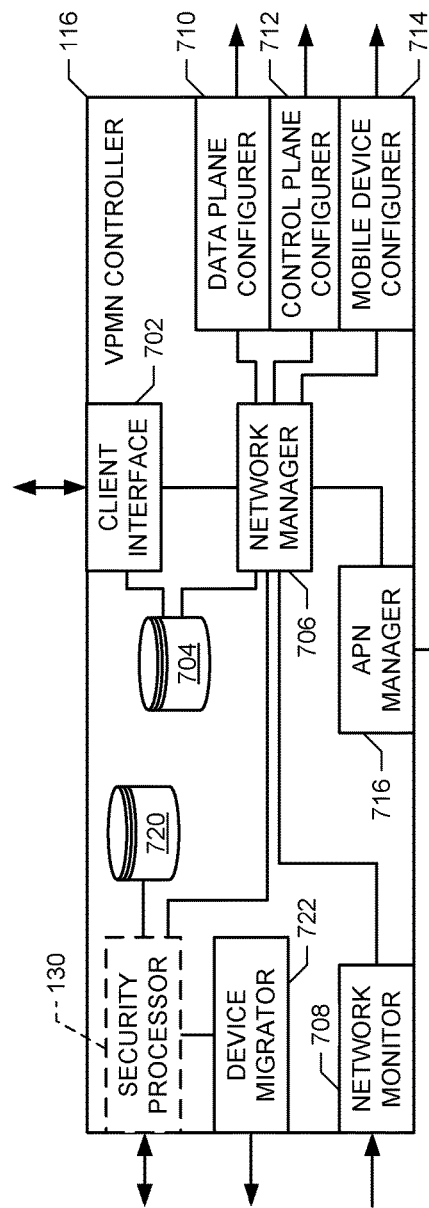
FIG. 6 illustrates example security rules with example security event profiles.
FIG. 7 illustrates a functional diagram of the example private mobile network controller and the security processor of FIGS. 1-5.

FIG. 6 shows the example security rules 216 of FIGS. 2-5 that include security event profiles 602-612 specified by, for example, the client administrator 122 of FIG. 1. The example security event profiles 602-612 include descriptions of security events that the VPMN controller 116, the security processor 130, and/or the network elements 108-112 and 210-214 use to identify potentially problematic communications. For example, the PCRF server 214 of FIGS. 2-5 may communicate the security rules 216 or, alternatively, each of the security event profiles 602-612 to, for example, the VPMNs 202 and 204 and/or the other network elements 108-112, 210, and 212. In other examples, the VPMN controller 116 and/or the security processor 130 may transmit the security rules and/or the security event profiles 602-612.

The example security event profiles 602-612 are shown including an identifier of a security event. For example, the security event profile 602 includes a 'Virus XXX' identifier. The security event profile 602 may also include a description of how the Virus XXX can be identified within communications. Further, the security event profile 602 may include a list of device identifiers and/or addresses known to be associated with the Virus XXX.

The example security rules 216 of FIG. 2 includes the example security event profile 604 that identifies a network worm and the example security event 606 that corresponds to a description for detecting a distributed denial of service (DDS) program. The example security event profile 608 includes a listing of modified mobile devices (e.g., jail broken devices). The example security event profile 610 identifies a security update that mobile devices must have to access a wireless mobile network and the example security event profile 612 identifies a potentially malicious application. In other examples, the security rules 216 may include additional, fewer, and/or different types of security event profiles.

FIG. 7 shows a functional diagram of the example VPMN controller 116 and the security processor 130 of FIG. 1. The example VPMN controller 116 and/or the security processor 130 may be included within a controller, server, processor, and/or computing center of a wireless mobile network provider. In some examples, the VPMN controller 116 and/or the security processor 130 may be included within a data plane and/or control plane allocation controller of a wireless mobile network provider.

To receive requests and/or security rules from clients (e.g., the client administrator 122 of FIG. 1) for VPMNs, the example VPMN controller 116 of the illustrated example includes a client interface 702 (e.g., the MaaS portal 120). The example client interface 702 provides a framework that enables clients to request a VPMN by selecting, for example, bandwidth requirements, geographic location, wireless spectrum frequencies, and/or which types of network elements are to host a VPMN. The request may also include client administrative information including billing information, profile information, network addresses, etc. In some examples, the client interface 702 may be a web-based interface that provides options and/or templates that clients can select to request a VPMN and/or specify security event profiles. In other examples, the client interface 702 may include a phone-request system and/or a form request system.

After receiving a request from a client for a VPMN, the client interface 702 creates a client account that includes the information provided by the client. The client interface 702 stores the client account to a client records database 704. In some examples, the HSS 212 of FIGS. 2-4 may access the client records database 704 for client profile information for security authentication and/or authorization. The client records database 704 may be implemented by Electronically Erasable Programmable Read-Only Memory (EEPROM), Random Access Memory (RAM), Read-Only Memory (ROM), and/or any other type of memory.

The example client interface 702 may also assign one or more APNs to a VPMN requested by a client. The client interface 702 may store the APN(s) to the client account in the client records database 704. Additionally, the client interface 702 may transmit the APN(s) and/or any information associated with a newly created VPMN to the client.

To manage the creation and/or management of VPMNs, the VPMN controller 116 of FIG. 7 includes a network manager 706. The example network manager 706 uses the information provided by the client to create a VPMN. The example network manager 706 may also receive requests from the security processor 130 to create a security VPMN (e.g., the security VPMN 204). To determine which network elements will host the VPMN, the network manager 706 receives a status of the wireless mobile network 104 via a network monitor 708.

The example network monitor 708 of the illustrated example scans the wireless mobile network 104 to determine network traffic conditions, bandwidth usage, and/or any QoS issues. In some examples, the network monitor 708 may maintain a history of network performance based on detected network conditions. The network monitor 708 may also determine an amount of available capacity and/or bandwidth within network elements (e.g., the network elements 108-112, 210-214, 402, and 404 of FIGS. 1-4).

The example network manager 706 of FIG. 7 uses the information from the network monitor 708 to identify available network elements to host a VPMN. The network manager 706 may also use information associated with other client VPMNs stored in the client records database 704 to determine if there is available capacity within the identified network elements based on already licensed VPMN usage. If there is no additional capacity for another VPMN, the network manager 706 identifies other available network elements.

For each of the network elements with available capacity, the network manager 706 allocates a portion of a control plane and/or a data plane. Allocating a data plane may include allocating a portion of a wireless spectrum of one or more eNodeBs for a VPMN. The network manager may also allocate a data plane by partitioning a portion of a switch within for example, the gateways 110 and 112 for network traffic associated with a VPMN. The network manager 706 may further allocate a data plane by designating certain interfaces of a switch and/or a router for a VPMN. After allocating data plane space to network elements, the network manager 706 sends an instruction to a data plane configurer 710 to configure a data plane on the allocated portions of the identified network elements.

The example network manager 706 allocates a control plane by, for example, designating a portion of IP address space that is to be associated with a VPMN. The portion of the IP address space may be referenced to an assigned APN. The example network manager 706 may also partition a control plane of a network element by virtualizing functionality of the network element specifically designated for a VPMN. The example network manager 706 may further allocate a control plane by partitioning portions of databases and/or servers (e.g., the MME 210, HSS 212, and/or the PCRF server 214) to store information associated with clients and/or subscribing customers of a VPMN and/or security rules. After allocating control plane space to network elements, the network manager 706 sends an instruction to a control plane configurer 712 to configure a control plane on the allocated portions of the identified network elements.

By allocating portions of a data plane and/or a control plane, the example network manager 706 may also specify a virtual circuit (and/or other type of private path such as, for example, a MPLS path) to be implemented within a VPMN. To specify a virtual circuit, the network manager 706 identifies outgoing and/or incoming interfaces of the network elements associated with the VPMN and/or IP address space allocated to the VPMN. The example network manager 706 then links together the interfaces, routers, switches, interfaces, and/or connections based on the identified information to create the virtual circuit and updates routing and/or forwarding tables within the corresponding network elements. Thus, any communications associated with a VPMN are transmitted between the VPMN allocated portions of the network elements.

Additionally, the network manager 706 may determine if separate eNodeBs are to be used for each VPMN (as described in conjunction with FIG. 4). If multiple eNodeBs are to be utilized, the client interface 702 receives parameters associated with the eNodeB. The network manager 706 uses the parameters and/or an assigned APN to associate the VPMN to an eNodeB. A mobile device configurer 714 and/or an APN manager 716 may then configure the eNodeB to be communicatively coupled to one or more serving gateways that have partitioned space for the VPMN.

To configure a VPMN on a data plane of network elements, the example VPMN controller 116 of FIG. 7 includes the data plane configurer 710. The example data plane configurer 710 provisions a VPMN on portions of network elements identified by the network manager 706 and/or the security processor 130. The example data plane configurer 710 may configure and/or provision a VPMN by designating, for example, frequencies of a wireless spectrum provided by an eNodeB for a VPMN.

Additionally, the data plane configurer 710 may designate portions of a server and/or a router (e.g., the gateways 110 and/or 112) for hosting the VPMN. The example data plane configurer 710 may also create a virtual circuit (e.g., MPLS path) for a VPMN by updating routing and/or forwarding tables of network elements based on information from the network manager 706. The example data plane configurer 710 may also dynamically change an amount of bandwidth and/or processing capacity provisioned for a VPMN based on instructions from the network manager 706.

For example, the network manager 106 may receive an indication from the network monitor 708 that a VPMN on a serving gateway is operating close to provisioned capacity. In this example, the network manager 106 may increase data plane space for the VPMN by instructing the data plane configurer 710 to provision additional interfaces, links, circuitry, and/or processing capacity of the serving gateway for the VPMN. Thus, the data plane configurer 710 enables a VPMN to be dynamically provisioned based on current, future, and/or predicted network traffic conditions.

To configure a VPMN on a control plane of network elements, the example VPMN controller 116 of FIG. 7 includes the control plane configurer 712. The example control plane configurer 710 provisions a VPMN on portions of network elements identified by the network manager 706 and/or the security processor 130. The example control plane configurer 710 may configure a VPMN in a control plane of a network element by updating routing and/or forwarding tables with an IP address space and/or an APN for communications associated with a VPMN.

The example control plane configurer 712 provisions a control plane for a security VPMN (e.g., the security VPMN 204 of FIGS. 2-5) by installing security protocols and/or analysis tools within the security VPMN. The additional security protocols and/or analysis tools enable the security VPMN to monitor, filter, analyze, and/or otherwise manipulate potentially problematic and/or threatening communications. The example control plane configurer 712 may also deploy algorithms, programs, and/or routines to collect information about the potentially problematic communications to determine a solution and/or for statistical and/or tracking analysis.

Further, the control plane configurer 712 may provision portions of a database storing client profile information and/or subscriber profile information so that the information is only accessible via a VPMN. In other examples, the control plane configurer 712 may update network elements with specialized service information for a VPMN. Thus, the control plane configurer 712 ensures that client and/or subscribing customer information associated with different VPMNs can be stored on the same network element so that the information is only accessible to entities and/or network elements associated with the corresponding VPMN.

To update mobile devices with information, thereby enabling the mobile devices to communicatively couple to a VPMN, the example VPMN controller 116 of FIG. 7 includes a mobile device configurer 714. The example mobile device configurer 714 may install functionality to a mobile device (e.g., the mobile device 402) to enable the mobile device to connect to a VPMN. For example, the mobile device configurer 714 may transmit an APN associated with a VPMN to corresponding mobile devices. The example mobile device configurer 714 may also transmit mobile device information and/or customer profile information to network elements to enable the network elements to authorize and/or authenticate a mobile device connecting to a VPMN. In other examples, a client (e.g., an MVNO) may pre-configure a mobile device with functionality to connect to a VPMN prior to providing the mobile device to a subscribing customer.

To propagate an APN assigned to a VPMN to network element(s), the example VPMN controller 116 of the illustrated example includes an APN manager 716. The example APN manager 716 receives an APN assigned to a VPMN by the network manager 706 and transmits the APN to network elements that have a portion of a control and/or a data plane partitioned for an associated VPMN. For example, the APN manager 716 may transmit an APN to the HSS 212 and/or the MME 210, thereby enabling the MME 210 to determine to which VPMN on the serving gateway 110 communications from a mobile device are to be routed. Additionally or alternatively, the APN manager 716 may transmit an assigned APN to the APN DNS servers 124 and 126 of FIG. 1. In examples where more than one APN is associated with a client, the APN manager 716 transmits the appropriate APN to network elements. Further, the APN manager 716 may update APNs stored on the network elements as the APNs are updated by the VPMN controller 116.

To identify potentially problematic communications, provision security VPMNs, and/or manage which mobile devices are communicatively coupled to which security VPMNs, the example VPMN controller 116 of FIG. 7 includes the security processor 130. In other examples, the security processor 130 may be external and communicatively coupled to the VPMN controller 116. For example, the security processor 130 may be implemented within a security VPMN hosted by, for example, the network elements 108-112 and 210-214.

In some examples, the security processor 130 monitors communications within, for example, the wireless mobile network 104 for potentially problematic and/or threatening communications. In other examples, the example security processor 130 may coordinate the monitoring of communications between, for example, the network elements 108-112 and 210-214 and/or VPMNs provisioned on the network elements 108-112 and 210-214. The example security processor 130 accesses a security database 720 to identify which communications are potentially threatening and/or problematic to the network elements 108-112 and 210-214.

The example security database 720 stores security rules (e.g., the security rules 216) that include security event profiles that describe how security events are to be detected. In some examples, the security database 720 may be included within, for example, the PCRF server 214 of FIGS. 2-5. The security database 720 stores records of security events and/or records identifying which mobile devices are associated with one or more security events. Network operators and/or the security processor 130 may use these records to create additional security event profiles and/or generate network statistics. The security database 720 may be implemented by Electronically Erasable Programmable Read-Only Memory (EEPROM), Random Access Memory (RAM), Read-Only Memory (ROM), and/or any other type of memory.

After detecting potentially problematic communications and/or receiving an indication of potentially problematic communications from, for example, the VPMN 202 of FIGS. 2-4, the example security processor 130 of FIG. 7 determines if a security VPMN is provisioned within the example network elements 108-112 and 210-214. If a security VPMN needs to be provisioned, the example security processor 130 provisions a security VPMN. To provision the security VPMN, the example security processor 130 may instruct the network manager 706 to identify available capacity within the network elements 108-112 and 210-214 and allocate control and/or data plane space for the security VPMN. The example network manager 706 then coordinates the creation of the security VPMN with the configurers 710-714. The example network manager 706 may also instruct the APN manager 716 to send an identified mobile device an APN of the newly provisioned VPMN. In other examples, the example security processor 130 may provision a security VPMN within the network elements 108-112 and 210-214.

In examples where a security VPMN is already provisioned, the example security processor 130 instructs a device migrator 722 to communicatively couple a mobile device (e.g., the mobile device 224 of FIGS. 2 and 3) to the security VPMN. The example device migrator 722 may use, for example, over the air programming via the serving gateway 110, the HSS 212, the MME 210 and/or the eNodeB 108 to provision a SIM card of a mobile device to communicatively couple the mobile device to a security VPMN. In this example, the device migrator 722 may determine an APN to provision the SIM card by accessing the APN manager 716. In other examples, the device migrator 722 may determine an APN for the security VPMN from a network provider and/or a client administrator. In other examples, the example security processor 130 may instruct the APN manager 716 to communicatively couple a mobile device to a security VPMN.

The example device migrator 722 of FIG. 7 migrates mobile devices from a security VPMN after the security processor 130, a security VPMN, and/or the network elements 108-112 and 210-214 determine that a cause of the potentially problematic communications has been resolved. In these examples, the device migrator 722 may send an APN to a non-security VPMN and/or an APN to the network elements 108-112 and 210-214. In other examples, the device migrator 722 may instruct the APN manager 716 to migrate the mobile device.

While the example VPMN controller 116 and/or the security processor 130 has been illustrated in FIG. 7, one or more of the servers, platforms, interfaces, data structures, elements, processes and/or devices illustrated in FIG. 7 may be combined, divided, re-arranged, omitted, eliminated and/or implemented in any way. Further, the example client interface 702, the example client resource database 704, the example network manager 706, the example network monitor 708, the example data plane configurer 710, the example control plane configurer 712, the example mobile device configurer 714, the example APN manager 716, the example security processor 130, the example security database 720, the example device migrator 722, and/or more generally, the example VPMN controller 116 may be implemented by hardware, software, firmware and/or any combination of hardware, software and/or firmware. Thus, for example, any of the example client interface 702, the example client resource database 704, the example network manager 706, the example network monitor 708, the example data plane configurer 710, the example control plane configurer 712, the example mobile device configurer 714, the example APN manager 716, the example security processor 130, the example security database 720, the example device migrator 722 and/or more generally, the example VPMN controller 116 could be implemented by one or more circuit(s), programmable processor(s), application specific integrated circuit(s) (ASIC(s)), programmable logic device(s) (PLD(s)) and/or field programmable logic device(s) (FPLD(s)), etc.

When any apparatus claim of this patent is read to cover a purely software and/or firmware implementation, at least one of the example client interface 702, the example client resource database 704, the example network manager 706, the example network monitor 708, the example data plane configurer 710, the example control plane configurer 712, the example mobile device configurer 714, the example APN manager 716, the example security processor 130, the example security database 720, and/or the example device migrator 722 are hereby expressly defined to include a computer readable medium such as a memory, DVD, CD, etc. storing the software and/or firmware. Further still, the example VPMN controller 116 and/or the security processor 130 may include one or more elements, processes and/or devices in addition to, or instead of, those illustrated in FIG. 7, and/or may include more than one of any or all of the illustrated elements, processes and devices.

Figure 8A:
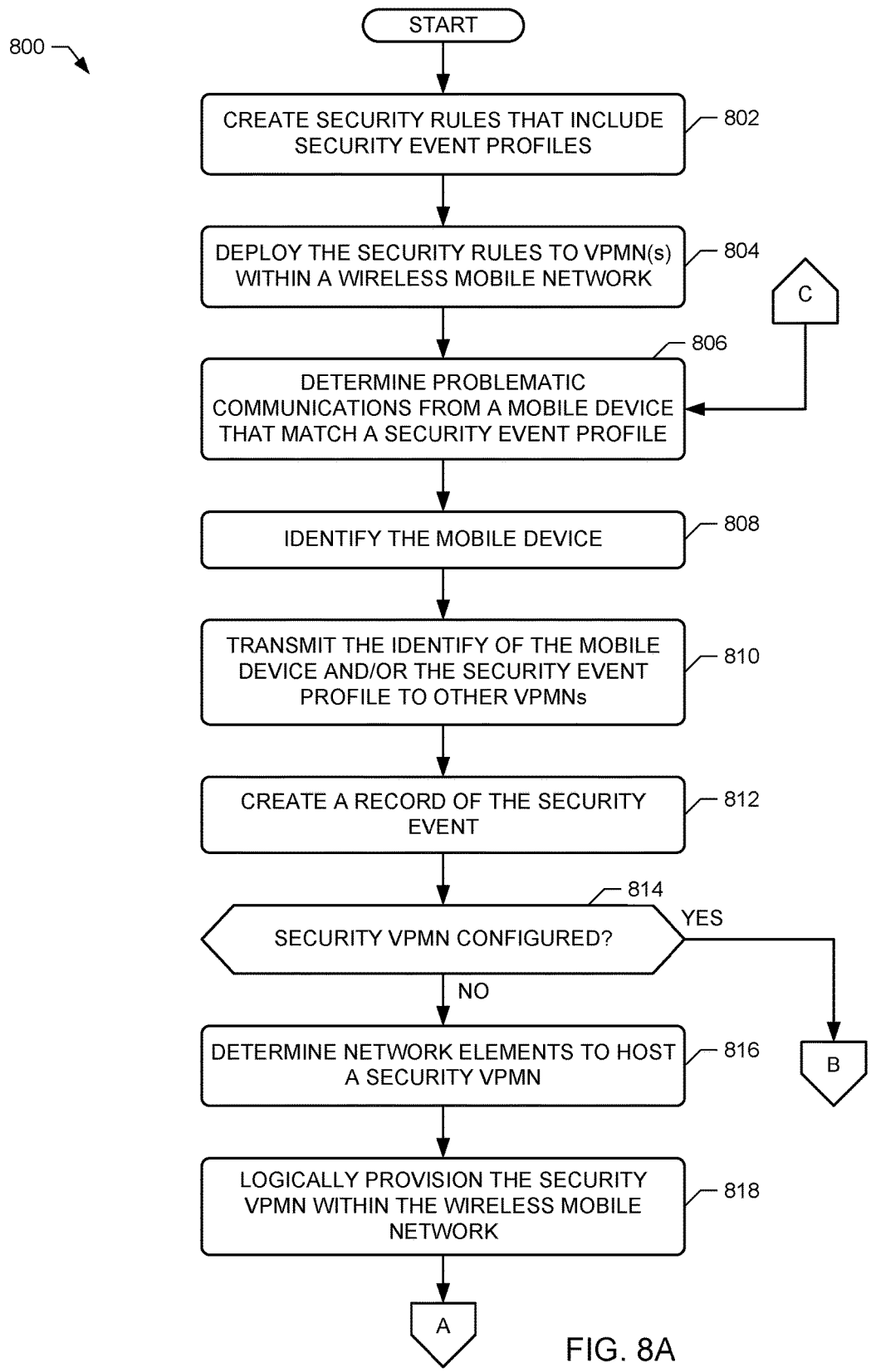
FIGS. 8A and 8B are flowcharts representative of example machine-accessible instructions, which may be executed to implement the virtual private mobile network controller and/or the security processor of FIGS. 1-7.
Figure 8B:
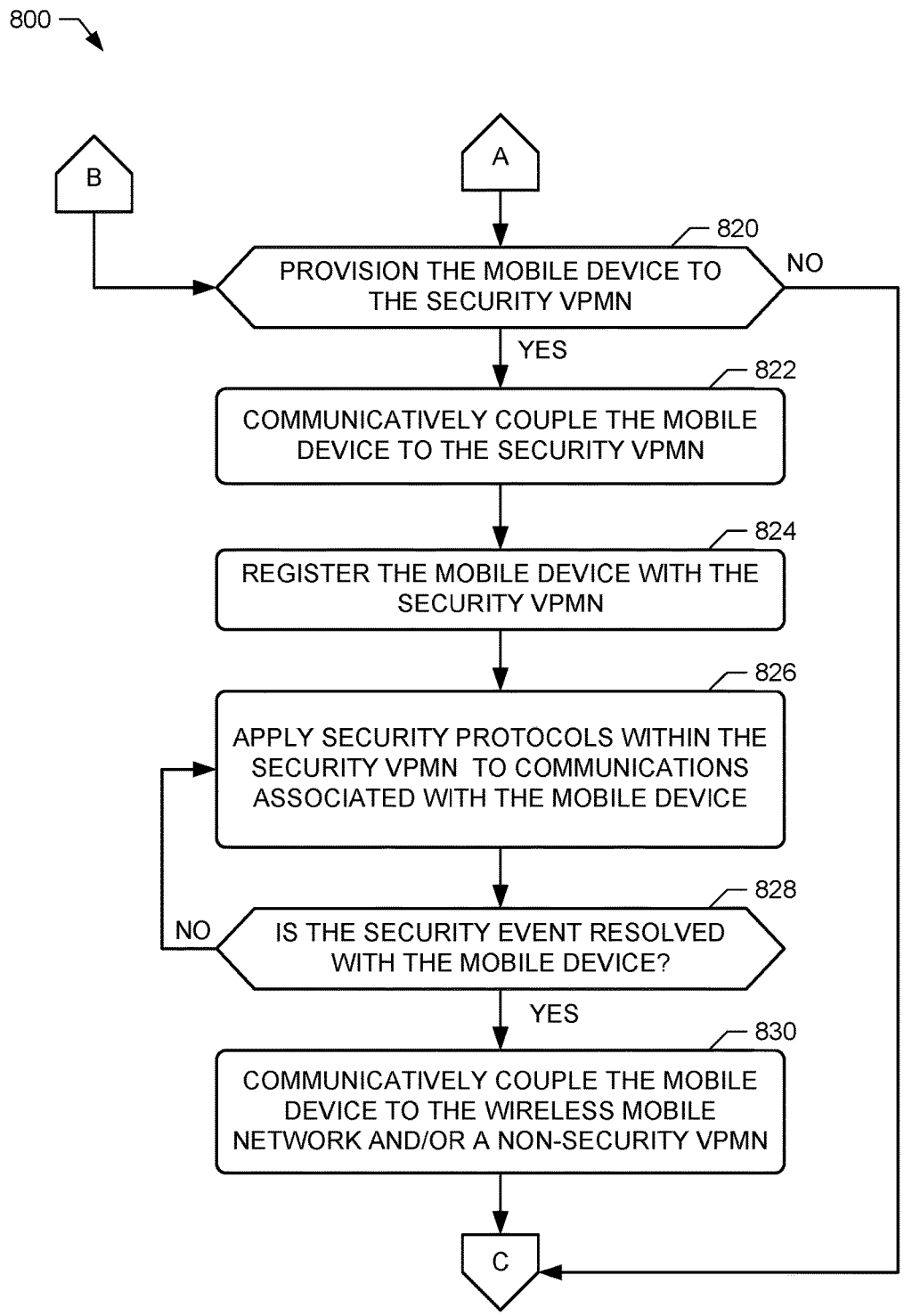

FIGS. 8A and 8B depict example flow diagrams representative of processes that may be implemented using, for example, computer readable instructions that may be used to configure virtual private mobile networks for security. The example processes of FIGS. 8A and 8B may be performed using a processor, a controller and/or any other suitable processing device. For example, the example processes of FIGS. 8A and 8B may be implemented using coded instructions (e.g., computer readable instructions) stored on a tangible computer readable medium such as a flash memory, a read-only memory (ROM), and/or a random-access memory (RAM). As used herein, the term tangible computer readable medium is expressly defined to include any type of computer readable storage and to exclude propagating signals. The example processes of FIGS. 8A and 8B may be implemented using coded instructions (e.g., computer readable instructions) stored on a non-transitory computer readable medium such as a flash memory, a read-only memory (ROM), a random-access memory (RAM), a cache, or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals.

Alternatively, some or all of the example processes of FIGS. 8A and 8B may be implemented using any combination(s) of application specific integrated circuit(s) (ASIC(s)), programmable logic device(s) (PLD(s)), field programmable logic device(s) (FPLD(s)), discrete logic, hardware, firmware, etc. Also, some or all of the example processes of FIGS. 8A and 8B may be implemented manually or as any combination(s) of any of the foregoing techniques, for example, any combination of firmware, software, discrete logic and/or hardware. Further, although the example processes of FIGS. 8A and 8B are described with reference to the flow diagrams of FIGS. 8A and 8B, other methods of implementing the processes of FIGS. 8A and/or 8B may be employed. For example, the order of execution of the blocks may be changed, and/or some of the blocks described may be changed, eliminated, sub-divided, or combined. Additionally, any or all of the example processes of FIGS. 8A and 8B may be performed sequentially and/or in parallel by, for example, separate processing threads, processors, devices, discrete logic, circuits, etc.

The example process 800 of FIGS. 8A and 8B provisions a VPMN for security by, for example, the VPMN controller 116 and/or the security processor 130 of FIGS. 1-7. The example process 800 begins by the example security processor 130 generating security rules that include security event profiles (block 802). The security rules may be specified by, for example, the client administrator 122 of FIG. 1. In other examples, the security processor 130 may generate the security rules from collected security events stored within the security database 720 of FIG. 7. After generating security rules, the example security processor 130 deploys (e.g., transmits) the security rules (e.g., the security rules 216) to VPMN(s) within, for example, the wireless mobile network 104 (block 804). Additionally or alternatively, the security processor 130 may transmit the security rules to the PCRF server 214 and/or the other network elements 108-112, 210, and 212.

The example process 800 continues by the example security processor 130 determining potentially problematic communications (and/or problematic communications) from a mobile device that match at least one security event profile within the security rules (block 806). The example security processor 130 determines the potentially problematic communications by matching the communications to at least one security event profile. The example security processor 130 may then classify the potentially problematic communication as a security event. The example security processor 130 then identifies a mobile device associated with the potentially problematic communications (block 808). The example security processor 130 may then transmit the identity of the mobile device and/or the security event to other VPMNs within the wireless mobile network 104 (block 810). Further, the security processor 130 creates a record of the security event and stores the record to the security database 720 (block 812).

The example security processor 130 next determines if a security VPMN is provisioned (block 814). If a security VPMN is not provisioned for the security event, the example security processor 130 and/or the network manager 706 of FIG. 7 identifies network elements (e.g., the network elements 108-112 and 210-214) to host a security VPMN (block 816). The example security processor 130 and/or the configurers 710-714 then logically provision the security VPMN within the wireless mobile network 104 (block 818).

The example process 800 of FIG. 8B continues by the example device migrator 722 determining if the mobile device is to be communicatively coupled to the security VPMN (block 820). Additionally, if the security VPMN is already deployed (block 814), the example device migrator 722 determines if the mobile device is to be communicatively coupled to the security VPMN. The example security processor 130 determines if the mobile device is to be migrated to the security VPMN based on a type of the security event, a severity of a security event, a number of security events associated with the mobile device, and/or any other criteria specified by, for example, the client administrator 122. If the mobile device is not to be communicatively coupled to the security VPMN, the example security processor 130 returns to determining potentially problematic communications within the wireless mobile network 104 (block 806). Additionally or alternatively, VPMNs and/or the network elements 108-112 and 210-214 monitor for potentially problematic communications while the example security processor 130 communicatively couples identified mobile devices to the security VPMN.

If the mobile device is to be communicatively coupled to the security VPMN, the example device migrator 722 and/or the APN manager 716 communicatively couples the mobile device to the security VPMN by provisioning a corresponding SIM card with an APN of the security VPMN (block 822). The example device migrator 722 and/or the APN manager 716 then register the mobile device with the security VPMN (block 824). The example security processor 130 and/or the security VPMN then apply security protocols and/or analysis tools to communications associated with the mobile device (block 826).

The example process 800 of FIG. 8B continues by the example security processor 130 and/or the security VPMN determining if the security event is resolved (block 828). If the security event is not resolve, the example security processor 130 and/or the security VPMN continue monitoring and/or analyzing communications from the mobile device (block 826). However, if the security event is resolved, the example device migrator 722 and/or the APN manager 716 communicatively couple the mobile device to a non-security VPMN, a previously accessed VPMN, and/or the wireless mobile network 104 without a VPMN (block 830). The example security processor 130 then monitors communications from the mobile device and/or other mobile devices to identify potentially problematic communications (block 806).

Figure 9:
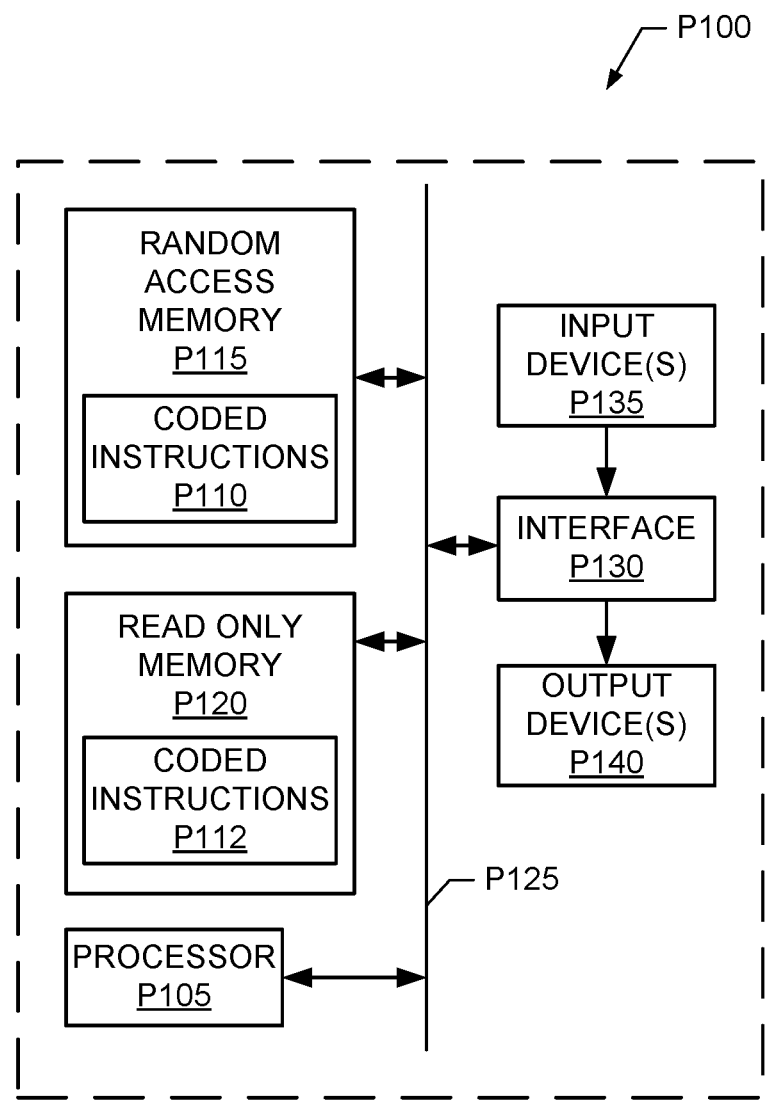
FIG. 9 is a schematic illustration of an example processor platform that may be used and/or programmed to execute the example processes and/or the example machine-accessible instructions of FIGS. 8A and/or 8B to implement any or all of the example methods, apparatus and/or articles of manufacture described herein.

FIG. 9 is a schematic diagram of an example processor platform P100 that may be used and/or programmed to implement the example client interface 502, the example client resource database 504, the example network manager 506, the example network monitor 508, the example data plane configurer 510, the example control plane configurer 512, the example mobile device configurer 514, the example APN manager 516, the example security processor 130, the example security database 720, the example device migrator 722 and/or more generally, the example VPMN controller 116 of FIGS. 1-7. For example, the processor platform P100 can be implemented by one or more general-purpose processors, processor cores, microcontrollers, etc.

The processor platform P100 of the example of FIG. 9 includes at least one general purpose programmable processor P105. The processor P105 executes coded instructions P110 and/or P112 present in main memory of the processor P105 (e.g., within a RAM P115 and/or a ROM P120). The processor P105 may be any type of processing unit, such as a processor core, a processor and/or a microcontroller. The processor P105 may execute, among other things, the example processes of FIGS. 8A and/or 8B to implement the example methods and apparatus described herein.

The processor P105 is in communication with the main memory (including a ROM P120 and/or the RAM P115) via a bus P125. The RAM P115 may be implemented by DRAM, SDRAM, and/or any other type of RAM device, and ROM may be implemented by flash memory and/or any other desired type of memory device. Access to the memory P115 and the memory P120 may be controlled by a memory controller (not shown). One or both of the example memories P115 and P120 may be used to implement the example resource client database 704 and/or the security database 720 of FIG. 7.

The processor platform P100 also includes an interface circuit P130. The interface circuit P130 may be implemented by any type of interface standard, such as an external memory interface, serial port, general-purpose input/output, etc. One or more input devices P135 and one or more output devices P140 are connected to the interface circuit P130.

At least some of the above described example methods and/or apparatus are implemented by one or more software and/or firmware programs running on a computer processor. However, dedicated hardware implementations including, but not limited to, application specific integrated circuits, programmable logic arrays and other hardware devices can likewise be constructed to implement some or all of the example methods and/or apparatus described herein, either in whole or in part. Furthermore, alternative software implementations including, but not limited to, distributed processing or component/object distributed processing, parallel processing, or virtual machine processing can also be constructed to implement the example methods and/or apparatus described herein.

To the extent the above specification describes example components and functions with reference to particular standards and protocols, it is understood that the scope of this patent is not limited to such standards and protocols. For instance, each of the standards for Internet and other packet switched network transmission (e.g., Transmission Control Protocol (TCP)/Internet Protocol (IP), User Datagram Protocol (UDP)/IP, HyperText Markup Language (HTML), HyperText Transfer Protocol (HTTP)) represent examples of the current state of the art. Such standards are periodically superseded by faster or more efficient equivalents having the same general functionality. Accordingly, replacement standards and protocols having the same functions are equivalents which are contemplated by this patent and are intended to be included within the scope of the accompanying claims.

Additionally, although this patent discloses example systems including software or firmware executed on hardware, it should be noted that such systems are merely illustrative and should not be considered as limiting. For example, it is contemplated that any or all of these hardware and software components could be embodied exclusively in hardware, exclusively in software, exclusively in firmware or in some combination of hardware, firmware and/or software. Accordingly, while the above specification described example systems, methods and articles of manufacture, the examples are not the only way to implement such systems, methods and articles of manufacture. Therefore, although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A method comprising:
provisioning first and second virtual private mobile networks within a wireless network, the first virtual private mobile network to process communications associated with a first type of security event and the second virtual private mobile network to process communications associated with a second type of security event;
after provisioning the first and second virtual private mobile networks, determining whether a first communication from user equipment corresponds to the first type of security event or the second type of security even;
transmitting, via a first base transceiver station, an instruction to cause the user equipment to communicatively couple to the first virtual private mobile network when the first communication corresponds to the first type of security event, or to communicatively couple to the second virtual private mobile network when the first communication corresponds to the second type of security event;
instructing the user equipment to transmit a second communication through a second base transceiver station that is physically separate from the first base transceiver station, and through the first virtual private mobile network when the first communication corresponds to the first type of security event; and
instructing the user equipment to transmit the second communication through the second base transceiver station, and through the second virtual private mobile network when the first communication corresponds to the second type of security event, the first and second virtual private mobile networks being isolated in a wireless spectrum from other portions of the wireless network, wherein the first type of security event and the second type of security event are different types of security events and at least one of the first type of security event and the second type of security event is at least one of a virus, a network worm, a denial of service attack, an unsupported feature on the user equipment, a vulnerability on the user equipment, and a malicious application on the user equipment.

2. The method of claim 1, wherein the provisioning of the first and second virtual private mobile networks includes causing the first and second virtual private mobile networks to implement first and second security policies, respectively, based on first and second security event profiles.

3. The method of claim 1, wherein the provisioning of the first and second virtual private mobile networks includes:
identifying available network elements within the wireless network; and
configuring a portion of a control plane and a portion of a data plane of the available network elements for the first virtual private mobile network.

4. The method of claim 3, wherein the network elements include at least one of a wireless base transceiver station, a serving gateway, a packet data network gateway, a mobility management entity, a home subscriber server, an eNodeB, a Serving General Packet Radio Service Support Node, and a Gateway General Packet Radio Service Support Node.

5. The method of claim 1, wherein first network elements in the first virtual private mobile network attempt to identify a potential threat to the wireless network, the potential threat associated with the first type of security event.

6. The method of claim 1, wherein the instructing of the user equipment to communicatively couple to the first virtual private mobile network includes using over the air programming to provision a subscriber identity module card associated with the user equipment with an access point name corresponding to the first virtual private mobile network.

7. The method of claim 1, wherein the first virtual private mobile network deploys a first defense strategy to handle security threats posed by communications associated with the first type of security event, and the second virtual private mobile network deploys a second defense strategy to handle security threats posed by communications associated with the second type of security event, at least one of the first and second defense strategies including at least one of blocking a third communication, filtering the third communication, and monitoring the third communication.

8. The method of claim 1, wherein the user equipment is first user equipment, a first security event profile is associated with a first potential threat to the wireless mobile network caused by the first type of security event, and further including:
communicating the first security event profile associated with the first potential threat to other virtual private mobile networks associated with the wireless network;
determining that a third communication matches the first security event profile in at least one of the other virtual private mobile networks; and
provisioning second user equipment associated with the third communication to communicatively couple to the first virtual private mobile network.

9. An apparatus comprising:
a processor; and
memory including machine readable instructions that, when executed by the processor, cause the processor to perform operations including:
provisioning first and second virtual private mobile networks within a wireless network, the first virtual private mobile network to process communications associated with a first type of security event and the second virtual private mobile network to process communications associated with a second type of security event, the first type of security event and the second type of security event being different types of security events, and at least one of the first type of security event and the second type of security event is at least one of a virus, a network worm, a denial of service attack, an unsupported feature on the user equipment, a vulnerability on the user equipment, and a malicious application on the user equipment;
after provisioning the first and second virtual private mobile networks, determining whether a first communication from user equipment corresponds to the first type of security event or the second type of security event,
transmitting, via a first base transceiver station, an instruction to cause the user equipment to communicatively couple to the first virtual private mobile network when the first communication corresponds to the first type of security event, or to communicatively couple to the second virtual private mobile network when the first communication corresponds to the second type of security event;
instructing the user equipment to transmit a second communication through a second base transceiver station that is physically separate from the first base transceiver station, and through the first virtual private mobile network when the first communication corresponds to the first type of security event; and instructing the user equipment to transmit the second communication through the second base transceiver station, and through the second virtual private mobile network when the first communication corresponds to the second type of security event, the first and second virtual private mobile networks being isolated in a wireless spectrum from other portions of the wireless network.

10. The apparatus of claim 9, wherein the instructions are to cause the processor to provision the first virtual private mobile network by installing a first security protocol within the first virtual private mobile network, and to provision the second virtual private mobile network by installing a second security protocol within the second virtual private mobile network.

11. The apparatus of claim 9, wherein the instructions are to cause the processor to communicatively couple the user equipment to the one of the first and second virtual private mobile networks by using over the air programming to provision a subscriber identity module card associated with the user equipment with an access point name corresponding to the one of the first and second virtual private mobile networks.

12. The apparatus of claim 9, wherein the first communication is determined to be associated with the first type of security event, the first type of security event is associated with a first potential threat, and the first virtual private mobile network includes security algorithms to deploy a defense strategy, the defense strategy including at least one of blocking, filtering and monitoring communications transmitted via the first virtual private mobile network.

13. The apparatus of claim 12, wherein the instructions are further to cause the processor to communicatively couple the user equipment to the wireless network after the potential threat is resolved.

14. A tangible computer readable medium including computer readable instructions that, when executed, cause a machine to perform operations comprising:

provisioning first and second virtual private mobile networks for security within a wireless network, the first virtual private mobile network to process communications associated with a first type of security event and the second virtual private mobile network to process communications associated with a second type of security event, the first type of security event and the second type of security event being different types of security events, and at least one of the first type of security event and the second type of security event is at least one of a virus, a network worm, a denial of service attack, an unsupported feature on the user equipment, a vulnerability on the user equipment, and a malicious application on the user equipment;

after the first and second virtual private mobile networks are provisioned, determining whether a first communication from user equipment corresponds to the first type of security event or the second type of security event;

transmitting, via a first base transceiver station, an instruction to cause the user equipment to communicatively couple to the first virtual private mobile network when the first communication corresponds to the first type of security event, or to communicatively couple to the second virtual private mobile network when the first communication corresponds to the second type of security event;

instructing the user equipment to transmit a second communication through a second base transceiver station that is physically separate from the first base transceiver station, and through the first virtual private mobile network when the first communication corresponds to the first type of security event; and instructing the user equipment to transmit the second communication through the second base transceiver station, and through the second virtual private mobile network when the first communication corresponds to the second type of security event, the first and second virtual private mobile networks being isolated in a wireless spectrum from other portions of the wireless network.

15. The tangible computer readable medium of claim 14, wherein the first communication is determined to correspond to the first type of security event, the first type of security event is associated with a security event profile is associated with a potential threat, and the instructions further cause the machine to perform operations including:

communicating the security event profile associated with the potential threat to other virtual private mobile networks associated with the wireless network;

determining a third communication matches the security event profile in the other virtual private mobile networks; and communicatively coupling second user equipment associated with the third communication to the first virtual private mobile network.

16. The tangible computer readable medium of claim 14, wherein the first communication is determined to correspond to the first type of security event, the first type of security event associated with a potential threat, and the instructions further cause the machine to perform operations including analyzing the first communication using security tools implemented within the first virtual private mobile network to determine a defense strategy, the defense strategy including at least one of blocking the first communication, filtering the first communication, and monitoring the first communication.

17. The tangible computer readable medium of claim 14, wherein to provision the first and second virtual private mobile networks, the instructions cause the machine to perform operations including:

identifying available network elements within the wireless network; and configuring a portion of a control plane and a portion of a data plane of the available network elements for the first virtual private mobile network.

* * * * *